(12) United States Patent
Zhang et al.

(10) Patent No.: US 10,326,986 B2
(45) Date of Patent: Jun. 18, 2019

(54) INTRA VIDEO CODING USING A DECOUPLED TREE STRUCTURE

(71) Applicant: QUALCOMM Incorporated, San Diego, CA (US)

(72) Inventors: Li Zhang, San Diego, CA (US); Wei-Jung Chien, San Diego, CA (US); Jianle Chen, San Diego, CA (US); Xin Zhao, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/676,314

(22) Filed: Aug. 14, 2017

(65) Prior Publication Data

US 2018/0048889 A1   Feb. 15, 2018

Related U.S. Application Data

(60) Provisional application No. 62/404,572, filed on Oct. 5, 2016, provisional application No. 62/375,383, filed on Aug. 15, 2016.

(51) Int. Cl.
*H04N 19/103* (2014.01)
*H04N 19/11* (2014.01)
(Continued)

(52) U.S. Cl.
CPC .......... *H04N 19/11* (2014.11); *H04N 19/159* (2014.11); *H04N 19/176* (2014.11);
(Continued)

(58) Field of Classification Search
CPC ....... H04N 19/103; H04N 19/11; H04N 19/12
(Continued)

(56) References Cited

U.S. PATENT DOCUMENTS

2013/0272401 A1* 10/2013 Seregin ................. H04N 19/46
375/240.12
2014/0086323 A1    3/2014 Chuang et al.
(Continued)

OTHER PUBLICATIONS

Chen et al., "Non-RCE1: Multiple LM Chroma Modes", 13th JCT-VC Meeting, MPEG Meeting; Apr. 18-26, 2013; Incheon; (Joint Collaborative Team on Video Coding of ISO/IEC JTC1/SC29/WG11 and ITU-T SG.16); No. JCTVC-M0116, Apr. 8, 2013, 4 pp.
(Continued)

*Primary Examiner* — Dominic D Saltarelli
(74) *Attorney, Agent, or Firm* — Shumaker & Sieffert, P.A.

(57) ABSTRACT

Processing circuitry of a device is configured to determine that a plurality of derived modes (DMs) available for predicting a luma block of video data are also available for predicting a chroma block of the video data, the chroma block corresponding to the luma block, to form a candidate list of prediction modes with respect to the chroma block, the candidate list including one or more DMs of the multiple DMs, to determine to code the chroma block using any DM of the candidate list. The processing circuitry may, based on the determination to code the chroma block using any DM of the one or more DMs of the candidate list, code an indication identifying a selected DM of the candidate list to be used for coding the chroma block. The processing circuitry may code the chroma block according to the selected DM of the candidate list.

14 Claims, 17 Drawing Sheets

(51) Int. Cl.
| | |
|---|---|
| *H04N 19/12* | (2014.01) |
| *H04N 19/159* | (2014.01) |
| *H04N 19/176* | (2014.01) |
| *H04N 19/186* | (2014.01) |
| *H04N 19/96* | (2014.01) |
| *H04N 19/70* | (2014.01) |
| *H04N 19/593* | (2014.01) |
| *H04N 19/463* | (2014.01) |

(52) U.S. Cl.
CPC ......... *H04N 19/186* (2014.11); *H04N 19/463* (2014.11); *H04N 19/593* (2014.11); *H04N 19/70* (2014.11); *H04N 19/96* (2014.11)

(58) Field of Classification Search
USPC ........................ 375/240.12, 240.14, 240.24
See application file for complete search history.

(56) References Cited

U.S. PATENT DOCUMENTS

| | | | | |
|---|---|---|---|---|
| 2014/0119439 | A1* | 5/2014 | Guo | H04N 19/70 375/240.12 |
| 2015/0016516 | A1* | 1/2015 | Saxena | H04N 19/105 375/240.12 |
| 2015/0016521 | A1* | 1/2015 | Peng | H04N 19/11 375/240.12 |
| 2015/0043641 | A1 | 2/2015 | Gamei et al. | |
| 2015/0085931 | A1* | 3/2015 | Cote | H04N 19/439 375/240.16 |
| 2016/0142732 | A1* | 5/2016 | Chono | H04N 19/136 375/240.08 |
| 2018/0063553 | A1 | 3/2018 | Zhang et al. | |

OTHER PUBLICATIONS

Chen et al., "Algorithm Description of Joint Exploration Test Model 3", Document: JVET-C1001 v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 pp.
Chuang et al.,"Luma Intra Prediction Mode Coding", JCT-VC Meeting; 97. MPEG Meeting; Jul. 14-22, 2011; Torino; (Joint Collaborative Team on Video Coding of ISO/ IEC JTC1/SC29/WG11 and ITU-T SG. 16); No. JCTVC-F062, Jul. 15, 2011, 5 pp.
International Search Report and Written Opinion of International Application No. PCT/US2017/046956, dated Nov. 7, 2017, 17 pp.
U.S. Appl. No. 15/676,345, by Qualcomm Incorporated (Inventors: Li Zhang et al.), filed Aug. 14, 2017.
Seregin et al., "Neighbor based intra most probable modes list derivation," JVET Meeting; Geneva, CH; May 26-Jun. 1, 2016; (The Joint Video Exploration Team of ISO/IEC JTC1/SC29/WG11 and ITU-T SG.16), JVET-C0055, May 16, 2016; 4 pp.
Song, et al., "CE6.c Report on SDIP chroma extension scheme," Joint Collaborative Team on Video Coding (JCT-VC) of ITU-T SG16 WP3 and ISO/IEC JTC1/SC29/WG11, Document: JCTVC-G267, 7th Meeting: Geneva, CH, Nov. 21-30, 2011, 6 pp.
Zhang et al., "Enhanced Cross-component Linear Model Intra-Prediction", 4th JVET Meeting; Oct. 15-21, 2016; Chengdu; (The Joint Video Exploration Team of ISO/IEC JTC1/SC29/WG11 and ITU-T SG.16 ); No. JVET-D0110-v4, Oct. 17, 2016, 6 pp.
Zhang et al., "EE5: Multiple Direct Modes for Chroma Intra Coding", 5th JVET Meeting; Jan. 12-20, 2017; Geneva; (The Joint Video Exploration Team of ISO/IEC JTC1/SC29/WG11 and ITU-T SG.16 ); No. JVET-E0062, Jan. 4, 2017, 3 pp.
Zhang et al., "Multiple Direct Modes for Chroma Intra Coding," JVET Meeting; Oct. 15-21, 2016; Chengdu; (The Joint Video Exploration Team of ISO/IEC JTC1/SC29/WG11 and ITU-T SG.16); No. JVET-D0111, Oct. 6, 2016, 4 pp.
Zhang et al., "Chroma Intra Prediction Based on Inter-Channel Correlation for HEVC", IEEE Transactions on Image rocessing, vol. 23, No. 1, Jan. 1, 2014, 13 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.263, Series H: Audiovisual and Multimedia Systems, Infrastructure of audiovisual services—Coding of moving video, Video coding for low bit rate communication, The International Telecommunication Union, Jan. 2005, 226 pp.
ITU-T H.262, Series H: Audiovisual and Multimedia Systems, Infrastructure of audiovisual services—Coding of moving video, Information technology—Generic coding of moving pictures and associated audio information: Video, The International Telecommunication Union, Feb. 2000, 220 pp.
ITU-T H261, Line Transmission of Non-Telephone Signals, Video Codec for Audiovisual Services At px64 kbits, The International Telecommunication Union, Mar. 1993, 29 pp.
Wang et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.
Chiu et al., "Cross-channel techniques to improve intra chroma prediction", Joint Collaborative Team on Video Coding (JCT-VC) of ITU-T SG16 WP3 and ISO/IEC JTC1/SC29/WG11, JCTVC-F502, 6th Meeting: Torino, IT, Jul. 14-22, 2011, 6 pp.
ITU_T H.223, Series H: Audiovisual and Multimedia Systems, Infrastructure of audiovisual services—Transmission of multiplexing and synchronization, Multiplexing protocol for low bit rate multimedia communication, The International Telecommunication Union, Jul. 2001, 74 pp.
Bross et al., "High efficiency video coding (HEVC) text specification draft 10 (for FDIS & Last Call)," Joint collaborative Team on Video Coding (JCT-VC) of ITU-T SG 16 WP 3 and ISO/IEC JTC 1/SC 29/WG 11, 12th Meeting: Geneva, CH, Jan. 14-23, 2013, JCTVC-L1003_v34, 263 pp.
Marpe et al., "Context-based adaptive binary arithmetic coding in the H.264/AVC video compression standard," IEEE Transactions on Circuits Systems for Video Technology, vol. 13, No. 7, Jul. 2003, 18 pp.
Sze et al., "High throughput CABAC entropy coding in HEVC," IEEE Transactions on Circuits and Systems for Video Technology (TCSVT), vol. 22, No. 12, Dec. 2012, 14 pp.
"High Efficiency Video Coding", Information technology—High Efficiency Coding and Media Delivery in Heterogeneous Environments—Part 2, Dec. 1, 2013, International Standard ISO/IEC 23008-2:2013(E),Oct. 2014, 312 pp.
Ford et al., "Colour space conversions" University of Westminster, London, Tech. Rep., Aug. 11, 1998, 31 pp.
Chen et al., "CE6.A.4: Chroma intra prediction by reconstructed luma samples", Joint Collaborative Team on Video Coding (JCT-VC) of ITU-T SG16 WP3 and ISO/IEC JTC1/SC29/WG11, JCTVC-E266, 5th Meeting: Geneva, Mar. 16-23, 2011, 10 pp.
An et al., "Block partitioning structure for next generation video coding", International Telecommunication Union, COM16-C966, Oct. 2015, 7 pp.
Joshi et al., "High Efficiency Video Coding (HEVC) Screen Content Coding: Draft 6" Joint Collaborative Team on Video Coding (JCT-VC) of ITU-T SG16 WP3 and ISO/IEC JTC1/SC29/WG11, JCTVC-W1005; 23rd Meeting: San Diego CA, Feb. 19-26, 2016, 233 pp.
Huang H., "EE2.1: Quadtree plus binary tree structure integration with JEM tools," Joint Video Exploration Team JVET) of ITU-T SG 16 WP 3 and ISO/IEC JTC 1/SC 29/WG 11, 3rd Meeting: Geneva, CH, May 26-Jun. 1, 2016, JVET-C0024, 5 pp.
Suehring K, et al., "JVET common test conditions and software reference configurations," Joint Video Exploration Team (JVET) of ITU-T SG16 WP3 and ISO/IEC JTC1/SC29/WG11, 2nd Meeting: San Diego, USA, Feb. 20-26, 2016, Document: JVET-B1010, 4 pages.

(56) References Cited

OTHER PUBLICATIONS

International Preliminary Report on Patentability from International Application No. PCT/US2017/046956, dated Feb. 28, 2019, 11 pp.

* cited by examiner

Guide:

✗ = Location of luma sample

○ = Location of chroma sample

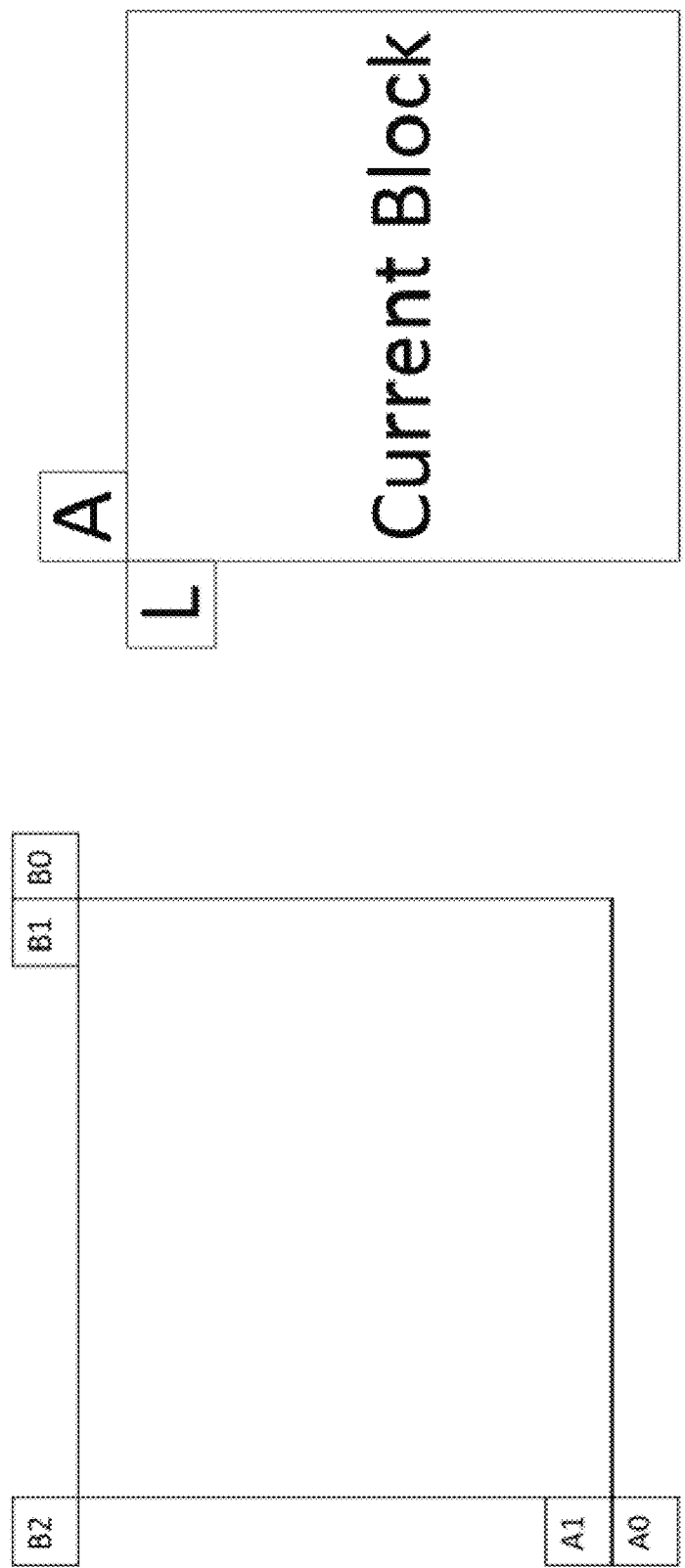

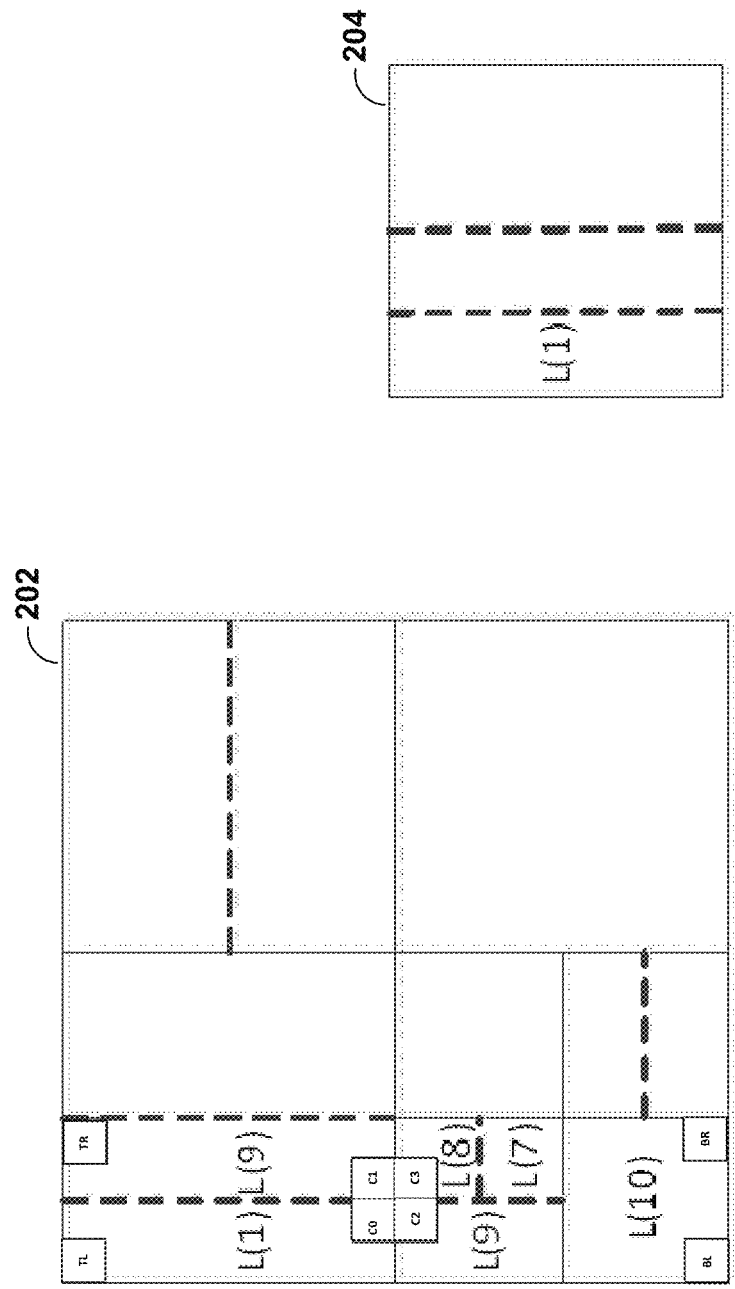

INTRA VIDEO CODING USING A DECOUPLED TREE STRUCTURE

This application claims the benefit of U.S. Provisional Application No. 62/375,383, filed on 15 Aug. 2016, and of U.S. Provisional Application No. 62/404,572, filed on 5 Oct. 2016, the entire contents of each of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by various video coding standards. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, a new video coding standard, namely High Efficiency Video Coding (HEVC), has recently been developed by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as "HEVC WD" hereinafter, is available from http://phenix.int-evry.fr/jct/doc_end_user/documents/14_Vienna/wg11/JCTVC-N1003-v1.zip. The specification of HEVC and its extensions including Format Range (RExt), Scalability (SHVC), and Multi-View (MV-HEVC) Extensions and Screen Content Extensions is available from http://phenix.int-evry.fr/jct/do-c_end_user/current_document.php?id=10481. ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding).

The groups are working together on this exploration activity in a joint collaboration effort known as the Joint Video Exploration Team (JVET) to evaluate compression technology designs proposed by their experts in this area. The JVET first met during 19-21 Oct. 2015. The latest version of the reference software, i.e., Joint Exploration Model 3 (JEM 3) can be downloaded from: https://jvet.h-hi.fraunhofer.de/svn/svn_HMJEMSoftware/tags/HM-16.6-JEM-3.0/. The algorithm description for JEM3 is further described in "Algorithm description of Joint Exploration Test Model 3," by J. Chen, E. Alshina, G. J. Sullivan, J.-R. Ohm, J. Boyce, JVET-C1001, Geneva, June 2016.

The video devices may transmit, receive, encode, decode, and/or store digital video information more efficiently by implementing such video coding techniques. Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which for some techniques may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to coding (e.g., decoding or encoding) of video data using intra prediction, in some cases, in accordance with tree structures that provide different splitting information for luma components and chroma components. That is, according to various partitioning schemes with which the described techniques are compatible, a luma partitioning tree structure may be decoupled from the corresponding chroma partitioning tree structure(s). The described techniques may be used in the context of advanced video codecs, such as extensions of HEVC or the next generation of video coding standards.

In one example, a device for coding video data includes a memory, and processing circuitry in communication with the memory. The memory of the device is configured to store video data. The processing circuitry is configured to determine that a plurality of derived modes (DMs) available for predicting a luma block of the video data stored to the memory are also available for predicting a chroma block of the video data stored to the memory, the chroma block corresponding to the luma block. The processing circuitry is further configured to form a candidate list of prediction modes with respect to the chroma block, the candidate list including one or more DMs of the multiple DMs that are available for predicting the chroma block. The processing circuitry is further configured to determine to code the chroma block using any DM of the one or more DMs of the candidate list, and to code, based on the determination to code the chroma block using any DM of the one or more DMs of the candidate list, code an indication identifying a selected DM of the candidate list to be used for coding the chroma block. The processing circuitry is further configured to code the chroma block according to the selected DM of the candidate list.

In another example, a method of coding video data includes determining that a plurality of derived modes (DMs) available for predicting a luma block of the video data are also available for predicting a chroma block of the video data that corresponds to the luma block. The method further includes forming a candidate list of prediction modes with respect to the chroma block, the candidate list including one or more DMs of the multiple DMs that are available for predicting the chroma block, and determining to code the chroma block using any DM of the one or more DMs of the candidate list. The method further includes coding, based on the determination to code the chroma block using any DM of the one or more DMs of the candidate list, an indication identifying a selected DM of the candidate list to be used for coding the chroma block, and coding the chroma block according to the selected DM of the candidate list.

In another example, an apparatus includes means for determining that a plurality of derived modes (DMs) available for predicting a luma block of the video data are also available for predicting a chroma block of the video data that corresponds to the luma block. The method further includes forming a candidate list of prediction modes with respect to the chroma block, the candidate list including one or more DMs of the multiple DMs that are available for predicting the chroma block, and determining to code the chroma block using any DM of the one or more DMs of the candidate list. The apparatus further includes means for forming a candidate list of prediction modes with respect to the chroma block, the candidate list including one or more DMs of the multiple DMs that are available for predicting the chroma block, and means for determining to code the chroma block using any DM of the one or more DMs of the candidate list. The apparatus further includes means for coding, based on the determination to code the chroma block using any DM of the one or more DMs of the candidate list, an indication identifying a selected DM of the candidate list to be used for coding the chroma block, and means for coding the chroma block according to the selected DM of the candidate list.

In another example, a non-transitory computer-readable storage medium is encoded with instructions that, when executed, cause a processor of a computing device to determine that a plurality of derived modes (DMs) available for predicting a luma block of the video data are also available for predicting a chroma block of the video data that corresponds to the luma block. The instructions, when executed, further cause the processor to form a candidate list of prediction modes with respect to the chroma block, the candidate list including one or more DMs of the multiple DMs that are available for predicting the chroma block, and to determine to code the chroma block using any DM of the one or more DMs of the candidate list. The instructions, when executed, further cause the processor to form a candidate list of prediction modes with respect to the chroma block, the candidate list including one or more DMs of the multiple DMs that are available for predicting the chroma block, and to determining to code the chroma block using any DM of the one or more DMs of the candidate list. The instructions, when executed, further cause the processor to code, based on the determination to code the chroma block using any DM of the one or more DMs of the candidate list, an indication identifying a selected DM of the candidate list to be used for coding the chroma block, and to code the chroma block according to the selected DM of the candidate list.

In another example, a device for coding video data includes a memory, and processing circuitry in communication with the memory. The memory of the device is configured to store video data. The processing circuitry is configured to form a most probable mode (MPM) candidate list for a chroma block of the video data stored to the memory, such that the MPM candidate list includes one or more derived modes (DMs) associated with a luma block of the video data associated with the chroma block, and a plurality of luma prediction modes that can be used for coding luminance components of the video data. The processing circuitry is further configured to select a mode from the MPM candidate list, and to code the chroma block according to the mode selected from the MPM candidate list.

In another example, a method of coding video data includes forming a most probable mode (MPM) candidate list for a chroma block of the video data, such that the MPM candidate list includes one or more derived modes (DMs) associated with a luma block of the video data associated with the chroma block, and a plurality of luma prediction modes that can be used for coding luminance components of the video data. The method further includes selecting a mode from the MPM candidate list, and coding the chroma block according to the mode selected from the MPM candidate list.

In another example, an apparatus includes means for forming a most probable mode (MPM) candidate list for a chroma block of the video data, such that the MPM candidate list includes one or more derived modes (DMs) associated with a luma block of the video data associated with the chroma block, and a plurality of luma prediction modes that can be used for coding luminance components of the video data. The apparatus further includes means for selecting a mode from the MPM candidate list, and means for coding the chroma block according to the mode selected from the MPM candidate list.

In another example, a non-transitory computer-readable storage medium is encoded with instructions that, when executed, cause a processor of a computing device to form a most probable mode (MPM) candidate list for a chroma block of video data, such that the MPM candidate list includes one or more derived modes (DMs) associated with a luma block of the video data associated with the chroma block, and a plurality of luma prediction modes that can be used for coding luminance components of the video data. The instructions, when executed, further cause the processor of the computing device to select a mode from the MPM candidate list, and to code the chroma block according to the mode selected from the MPM candidate list.

The details of one or more examples are set forth in the accompanying drawings and the description below. Other features, objects, and advantages will be apparent from the description and drawings, and from the claims.

BRIEF DESCRIPTION OF DRAWINGS

FIGS. 12A and 12B illustrate neighboring block selections for adaptive ordering of chroma prediction modes, according to one or more aspects of this disclosure.

FIGS. 13A and 13B are conceptual diagrams illustrating examples of block positions that video encoding and decoding devices may use to select chroma intra prediction modes according to the multiple DM mode selection-based techniques described above.

DETAILED DESCRIPTION

Figure 1:
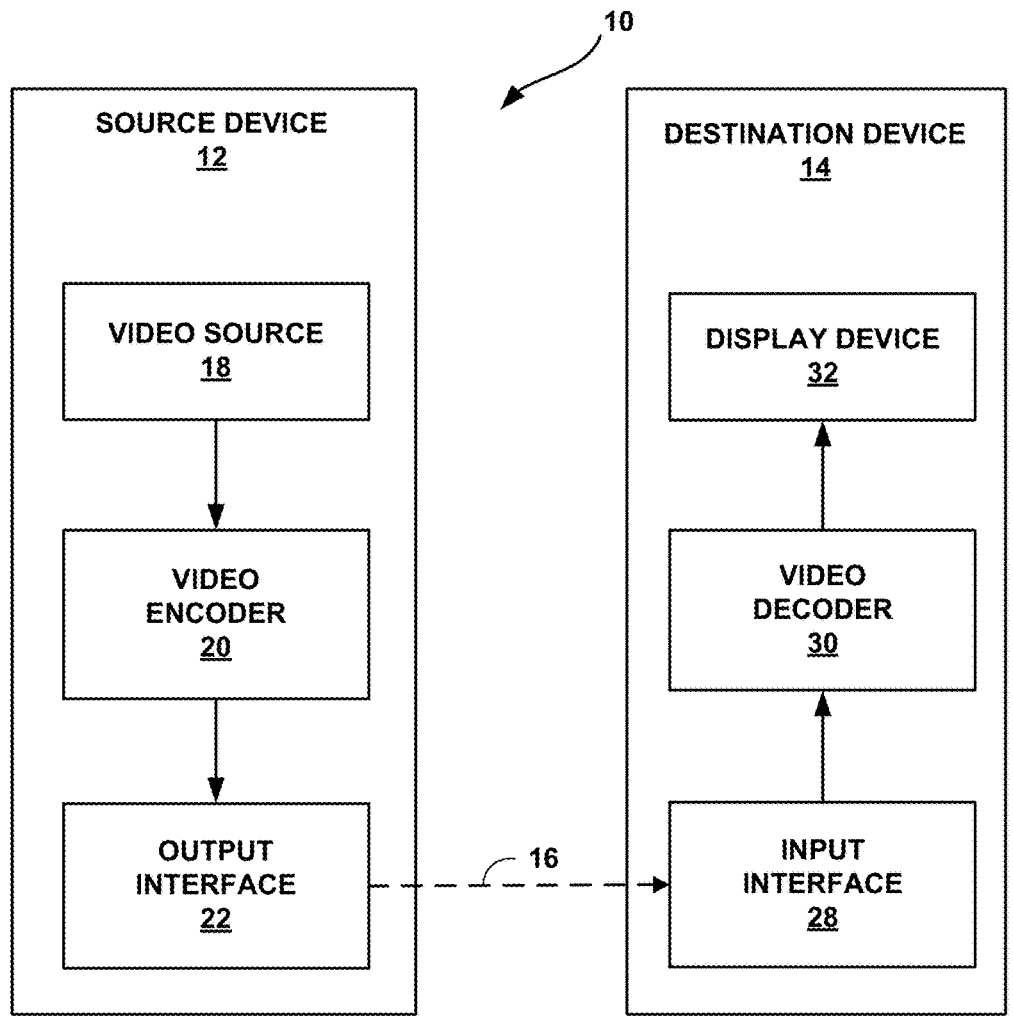
FIG. 1 is a block diagram illustrating an example video encoding and decoding system that may be configured to perform the techniques of this disclosure.

FIG. 1 is a block diagram illustrating an example video encoding and decoding system 10 that may be configured to perform the techniques of this disclosure for motion vector prediction. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques of this disclosure for motion vector prediction. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. The techniques of this disclosure for motion vector prediction may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, extensions to the HEVC standard, or subsequent standards, such as ITU-T H.266. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. One joint draft of MVC is described in "Advanced video coding for generic audiovisual services," ITU-T Recommendation H.264, March, 2010.

In addition, there is a newly developed video coding standard, namely High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://phenix.int-evry.fr/jct/doc_end_user/documents/12_Geneva/wg11/JCTVC-L1003-v34.zip. The HEVC standard is also presented jointly in Recommendation ITU-T H.265 and International Standard ISO/IEC 23008-2, both entitled "High efficiency video coding," and both published October, 2014.

The JCT-VC developed the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HEVC HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N (in the case of an 8×8 CUs), and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In accordance with one or more techniques of this disclosure, video encoder 20 and/or video decoder 30 may implement one or more of the techniques of this disclosure. For instance, video encoder 20 and/or video decoder 30 may use affine models in motion estimation and compensation.

Figure 2:
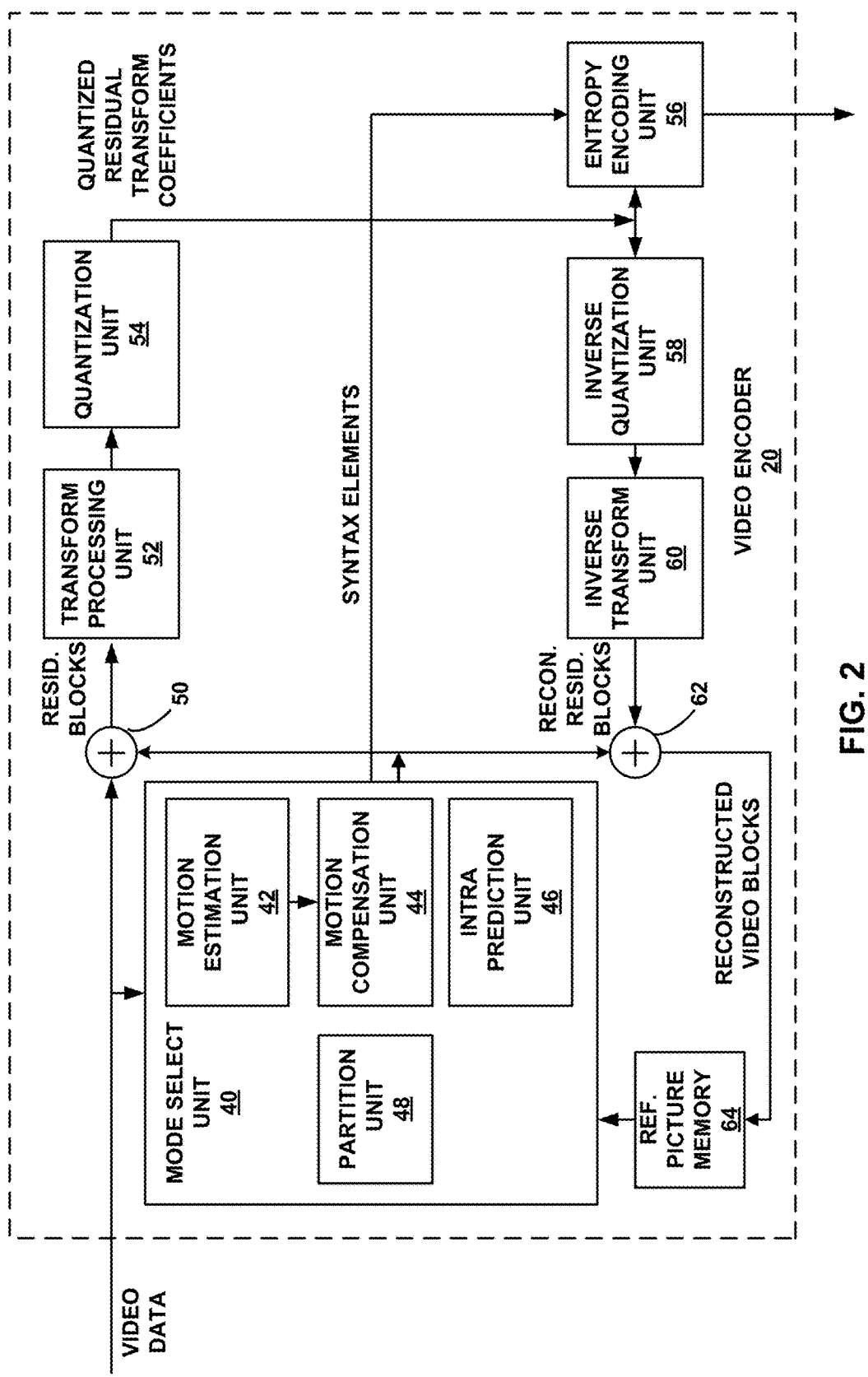
FIG. 2 is a block diagram illustrating an example of video encoder that may be configured to perform the techniques of this disclosure.

FIG. 2 is a block diagram illustrating an example of video encoder 20 that may be configured to perform the techniques of this disclosure for motion vector prediction. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Video encoder 20 may be configured to perform any of the various techniques of this disclosure discussed above with respect to FIG. 1, and as will be described in more detail below. For example, motion compensation unit 44 may be configured to code motion information for a block of video data using AMVP or merge mode in accordance with the techniques of this disclosure.

Assuming that motion compensation unit 44 elects to perform merge mode, motion compensation unit 44 may form a candidate list including a set of merge candidates. Motion compensation unit 44 may add candidates to the candidate list based on a particular, predetermined order. Motion compensation unit 44 may also add additional candidates and perform pruning of the candidate list, as discussed above. Ultimately, mode select unit 40 may determine which of the candidates is to be used to encode motion information of the current block, and encode a merge index representing the selected candidate.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Figure 3:
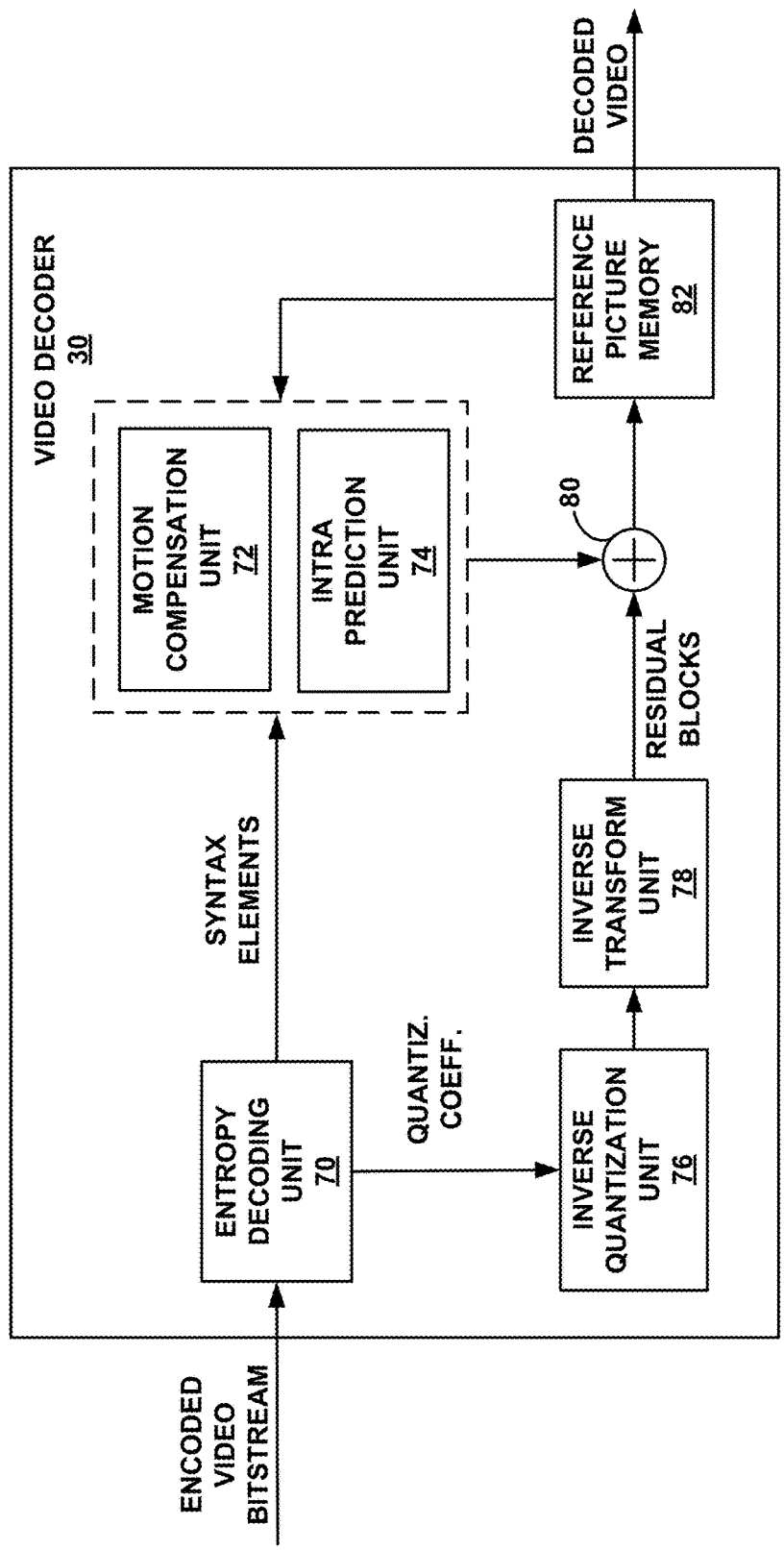
FIG. 3 is a block diagram illustrating an example of video decoder that may be configured to perform the techniques of this disclosure.

FIG. 3 is a block diagram illustrating an example of video decoder 30 that may be configured to perform the motion vector prediction techniques of this disclosure. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Video decoder 30 may be configured to perform any of the various techniques of this disclosure discussed above with respect to FIG. 1, and as will be discussed in more detail below. For example, motion compensation unit 72 may be configured to determine to perform motion vector prediction using AMVP or merge mode in accordance with the techniques of this disclosure. Entropy decoding unit 70 may decode one or more syntax elements representing how motion information is coded for the current block.

Assuming that the syntax elements indicate that merge mode is performed, motion compensation unit 72 may form a candidate list including a set of merge candidates. Motion compensation unit 72 may add candidates to the candidate list based on a particular, predetermined order. Motion compensation unit 72 may also add additional candidates and perform pruning of the candidate list, as discussed above. Ultimately, motion compensation unit 72 may decode a merge index representing which of the candidates is used to code motion information for the current block.

Inverse quantization unit 76 inverse quantizes, i.e., de-quantizes, quantized transform coefficients provided in the bitstream and entropy decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Figure 4:
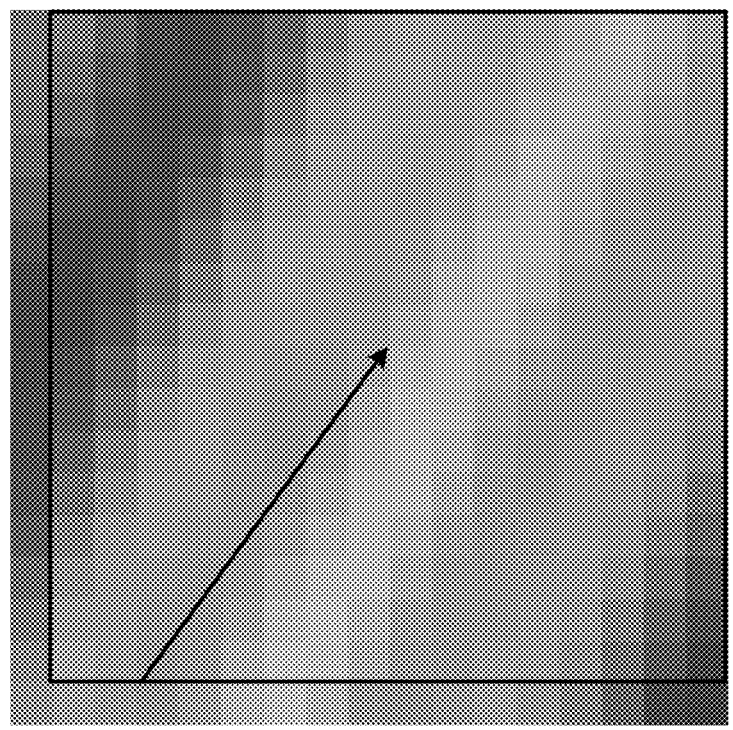
FIG. 4 is a conceptual diagram illustrating aspects of intra prediction.

FIG. 4 is a conceptual diagram illustrating aspects of intra prediction. Video encoder 20 and/or video decoder 30 may implement Intra prediction to perform image block prediction by using the block's spatially neighboring reconstructed image samples. A typical example of the Intra prediction for a 16×16 image block is shown in FIG. 4. As illustrated in FIG. 4, with Intra prediction, the 16×16 image block (in solid-lined square) is predicted by the above and left neighboring reconstructed samples (reference samples) located in the recent above row and left column along a selected prediction direction (as indicated by the arrow). In HEVC, for the Intra prediction of a luma block 35 modes are included.

Figure 5:
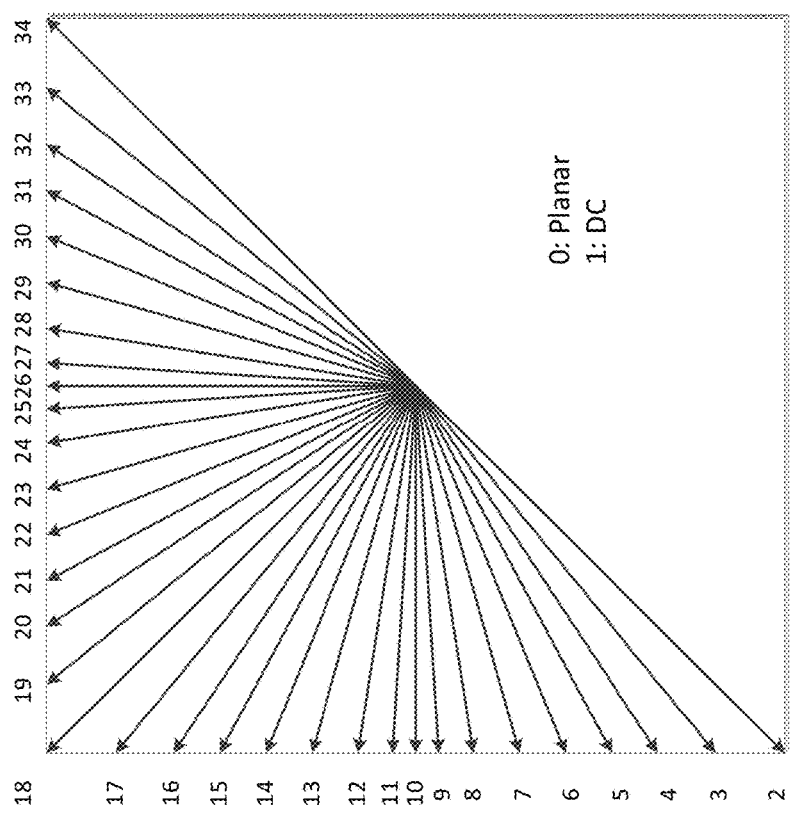
FIG. 5 is a conceptual diagram illustrating intra prediction modes for a luma block.

FIG. 5 is a conceptual diagram illustrating intra prediction modes for a luma block. The modes include the Planar mode, DC mode, and 33 angular modes, as indicated in FIG. 5. The 35 modes of the Intra prediction defined in HEVC are indexed as shown below in Table 1:

TABLE 1

Specification of intra prediction mode and associated names

| Intra prediction mode | Associated name |
|---|---|
| 0 | INTRA_PLANAR |
| 1 | INTRA_DC |
| 2 ... 34 | INTRA_ANGULAR2..INTRA_ANGULAR34 |

Figure 6:
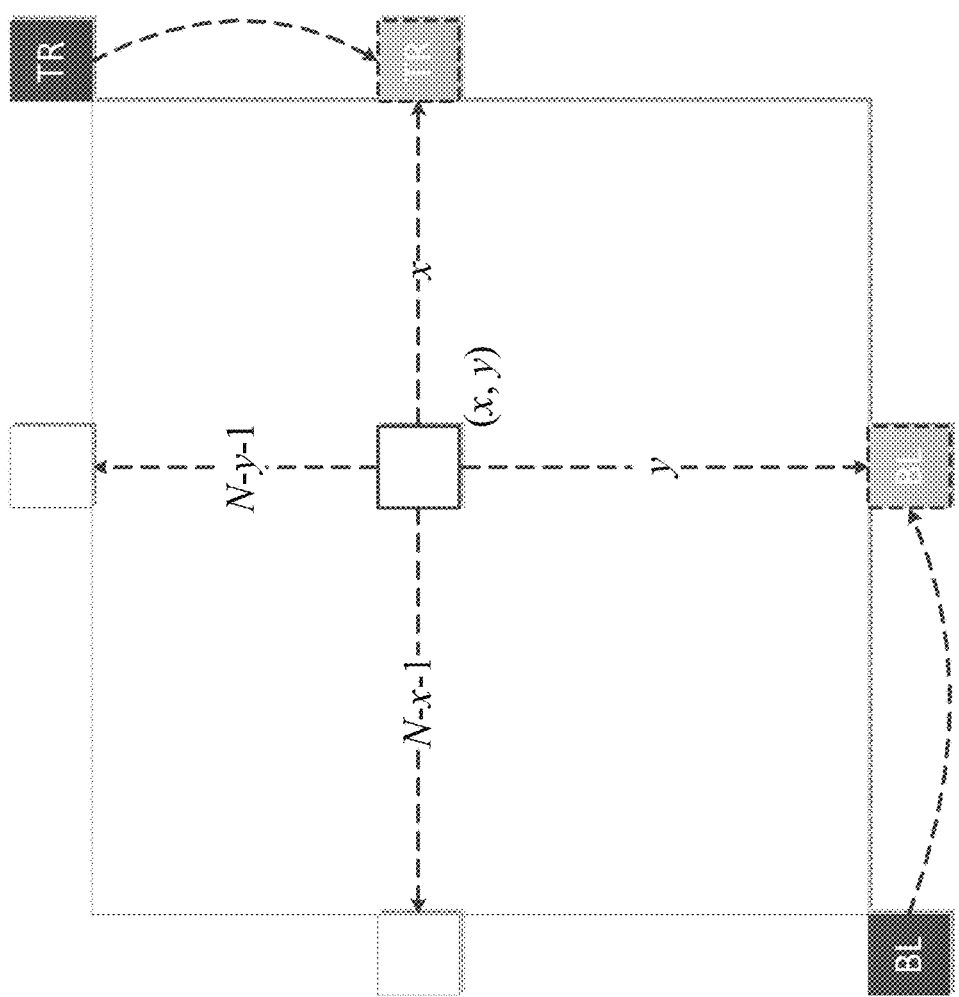
FIG. 6 is a conceptual diagram illustrating aspects of the planar mode.

FIG. 6 is a conceptual diagram illustrating aspects of the planar mode. For Planar mode, which is typically the most frequently used Intra prediction mode, the prediction sample is generated as shown in FIG. 6. To perform Planar prediction for an N×N block, for each sample $p_{xy}$ located at (x, y), video encoder 20 and/or video decoder 30 may calculate the prediction value using four specific neighboring reconstructed samples, i.e., reference samples, with bilinear filter. The four reference samples include the top-right reconstructed sample TR, the bottom-left reconstructed sample BL, the two reconstructed samples located at the same column (rx,−1) of the current sample denoted by T and at the same row (r−1,y) of the current sample denoted by L. The planar mode can be formulated as shown in the following equation: $p_{xy}=(N-x-1)\cdot L+(N-y-1)\cdot T+x\cdot TR+y\cdot BL$ For DC mode, the prediction block is simply filled with the average value of the neighboring reconstructed samples.

Generally, both Planar and DC modes are applied for modeling smoothly varying and constant image regions.

Figure 7:
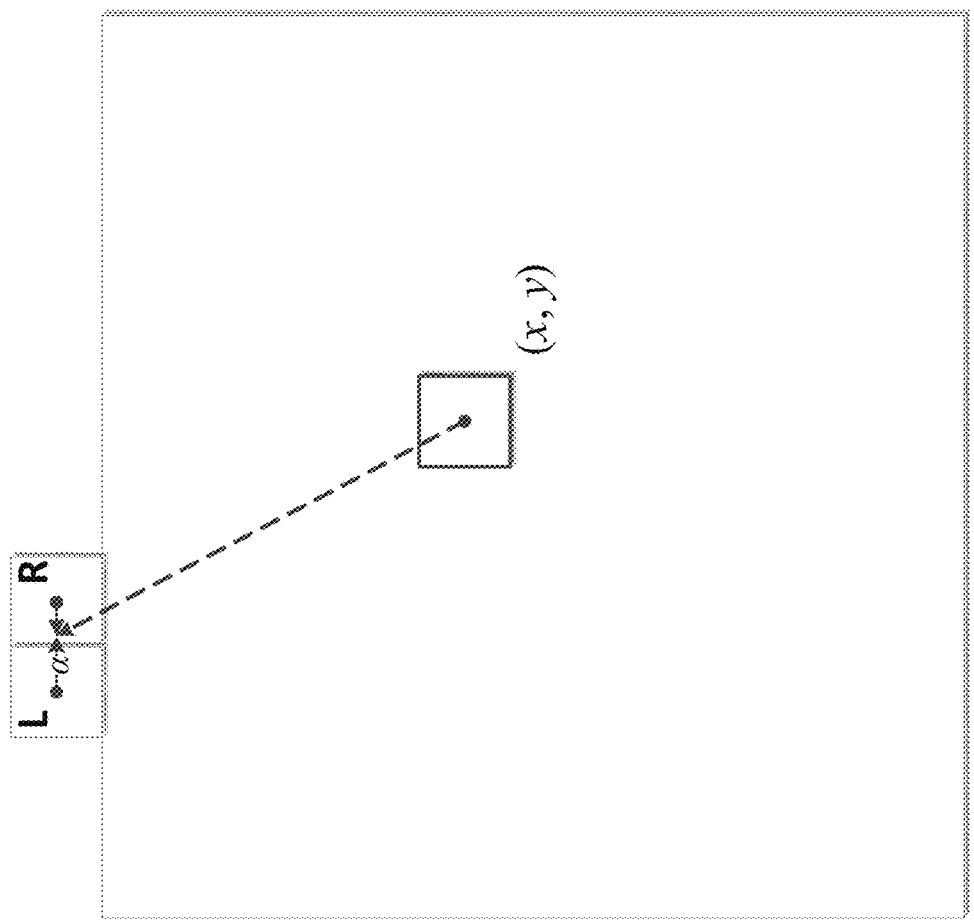
FIG. 7 is a conceptual diagram illustrating aspects of an angular mode according to HEVC.

FIG. 7 is a conceptual diagram illustrating aspects of an angular mode according to HEVC. For angular Intra prediction modes in HEVC, which include a total of 33 different prediction directions, the Intra prediction process is described as follows. For each given angular Intra prediction, the Intra prediction direction can be identified accordingly. For example, according to FIG. 5, Intra mode 18 corresponds to a pure horizontal prediction direction, and Intra mode 26 corresponds to a pure vertical prediction direction. Given a specific Intra prediction direction, for each sample of the prediction block, the sample's coordinates (x, y) are first projected to the row/column of neighboring reconstructed samples along the prediction direction, as shown in an example in FIG. 7. Supposing the (x,y) pair is projected to the fractional position a between two neighboring reconstructed samples L and R, then the prediction value for (x, y) is calculated using a two-tap bi-linear interpolation filter, formulated as shown in the following equation: $p_{xy}=(1-\alpha)\cdot L+\alpha\cdot R$. To avoid floating point operations, in HEVC, the above calculation is actually approximated using integer arithmetic as $p_{xy}=((32-a)\cdot L+a\cdot R+16)>>5$, where a is a integer equal to $32*\alpha$.

Aspects of chroma encoding and decoding are generally described below. Quite often, structures in the chroma signal follow those of the corresponding luma signal. As described, each luma block corresponds to one chroma block while each chroma prediction block may correspond to one or four luma prediction blocks based on the partition size of the luma prediction block equal to 2N×2N or N×N, according to HEVC. Taking advantage of these characteristics and general tendencies of chroma signal structures, HEVC provides a mechanism by which video encoder 20 may indicate to video decoder 30 the cases or instances in which a chroma PU is predicted using the same prediction mode as the corresponding selected luma PU. Table 2 below specifies a mode arrangement that video encoder 20 may use to signal the chroma mode for a chroma PU. For instance, one intra-coded chroma PU can be predicted using a mode selected from one of five (5) modes, including the planar mode (INTRA_PLANAR), Vertical mode (INTRA_ANGULAR26), Horizontal mode (INTRA_ANGULAR10), DC mode (INTRA_DC) and Derived mode (DM). The DM is set to be the intra prediction mode used for predicting the corresponding selected luma PU. For example, if the corresponding selected luma PU is coded with an intra mode with an index equal to 11, then the DM is set to the intra mode with the index equal to 11.

TABLE 2

Specification of Chroma Intra Prediction Modes and Associated Names

| | Chroma Intra prediction mode | Primary mode | Chroma intra Alternative mode, if the default mode is equal to the derived mode |
|---|---|---|---|
| Default modes | 0 | INTRA_PLANAR | INTRA_ANGULAR34 |
| | 1 | INTRA_ANGULAR26 | INTRA_ANGULAR34 |
| | 2 | INTRA_ANGULAR10 | INTRA_ANGULAR34 |
| | 3 | INTRA_DC | INTRA_ANGULAR34 |
| | 4 | Derived mode (DM) | N/A |

If the derived mode is indicated for a PU in the encoded video bitstream, video decoder 30 may perform the prediction for the chroma PU using the prediction mode that was used for the corresponding luma PU. To mitigate redundancy issues that could possibly arise when the derived mode refers to one of the prediction modes that is always present, video encoder 20 and video decoder 30 may use a designated alternative mode as a substitute for the duplicate mode. As shown in Table 2 above, video encoder 20 and video decoder 30 may use the "INTRA_ANGULAR34" chroma alternative mode, also referred to as the "angular (34) mode" as a substitute to remove redundancies. For instance, the relationship between chroma PUs and luma PUs is either one-to-one or many-to-one, video encoder 20 and video decoder 30 may determine the prediction mode for a chroma PU by selecting the prediction mode that is applicable to the single corresponding luma PU.

In some instances, however, one chroma PU may correspond to multiple luma PUs. Scenarios in which a single chroma PU corresponds to multiple luma PUs are considered exceptions or "special cases" with respect to chroma encoding and decoding. For example, in some of these special cases, one chroma PU may correspond to four luma PUs. In special cases in which the chroma-luma relationship is one-to-many, video encoder 20 and video decoder 30 may determine the prediction mode for a chroma PU by selecting the prediction mode used for the corresponding top-left luma PU.

Video encoder 20 and video decoder 30 may entropy code (entropy encode and entropy decode respectively) data indicating chroma prediction modes for a block of video data. In accordance with chroma mode coding, video encoder 20 may assign a 1-b syntax element (0) to the single most-often occurring derived mode, while assigning 3-b syntax elements (100, 101, 110, and 111 respectively) to each of the remaining four modes. Video encoder 20 and video decoder 3 may code only the first bin with one context model, and may bypass code the remaining two bins (if needed).

Video encoder 20 and video decoder 30 may entropy code (entropy encode and entropy decode respectively) video data according to context-adaptive binary arithmetic coding (CABAC). CABAC is a method of entropy coding first introduced in H.264/AVC, and described in "Context-based adaptive binary arithmetic coding in the H.264/AVC video compression standard," by D. Marpe, H. Schwarz, and T. Wiegand IEEE Trans. Circuits Syst. Video Technol., vol. 13, no. 7, pp. 620-636, July 2003. CABAC is now used in the High Efficiency Video Coding (HEVC) video coding standard. Video encoder 20 may video decoder 30 may use CABAC for entropy coding in a manner similar to CABAC as performed for HEVC.

CABAC involves three main functions: binarization, context modeling, and arithmetic coding. The binarization function maps syntax elements to binary symbols (bins) which are called bin strings. The context modeling function estimates the probability of the bins. The arithmetic coding function (also referred to as binary arithmetic coding) compresses the bins to bits, based on the estimated probability.

Video encoder 20 and video decoder 30 may perform binarization for CABAC using one or more of several different binarization processes provided in HEVC. The binarization processes provided in HEVC include unary (U), truncated unary (TU), kth-order Exp-Golomb (EGk), and fixed length (FL) techniques. Details of these binarization processes are described in "High throughput CABAC entropy coding in HEVC," by V. Sze and M. Budagavi, IEEE Transactions on Circuits and Systems for Video Technology (TCSVT), vol. 22, no. 12, pp. 1778-1791, December 2012.

In accordance with unary-based encoding, video encoder 20 may signal a bin string of length N+1, where 'N' represents an integer value, where the first N bins are 1 (in value), and where the last bin is 0 (in value). In accordance with unary-based decoding, video decoder 30 may search for a 0 value of a bin. Upon detecting a 0-value bin, video decoder 30 may determine that the syntax element is complete.

According to truncated unary coding, video encoder 20 may encode has one less bin than in the case of unary coding. For instance, video encoder 20 may set a maximum on the largest possible value of the syntax element. The maximum value is denoted herein by "cMax." When (N+1) <cMax, video encoder 20 may implement the same signaling as with unary coding. However, when (N+1)=cMax, video encoder 20 may set all bins to a respective value of 1. Video decoder 30 may search for a 0-value bin, until a cMax number of bins have been inspected, to determine when the syntax element is complete. Aspects of, and contrasts between, bin strings used in unary and truncated unary coding are illustrated in Table 3 below. The contrasting bin values are illustrated in Table 3 are called out using bold italics.

TABLE 3

Bin string examples of Unary and Trucated Unary

| prefixVal | Unary Bin string | | | | | | Truncated Unary (cMax = 6) Bin string | | | | |
|---|---|---|---|---|---|---|---|---|---|---|---|
| 0 | 0 | | | | | | 0 | | | | |
| 1 | 1 | 0 | | | | | 1 | 0 | | | |
| 2 | 1 | 1 | 0 | | | | 1 | 1 | 0 | | |
| 3 | 1 | 1 | 1 | 0 | | | 1 | 1 | 1 | 0 | |
| 4 | 1 | 1 | 1 | 1 | 0 | | 1 | 1 | 1 | 1 | 0 |
| 5 | 1 | 1 | 1 | 1 | 1 | 0 | 1 | 1 | 1 | 1 | 1 |
| ... | | | | | | | | | | | |
| binIdx | 0 | 1 | 2 | 3 | 4 | 5 | 0 | 1 | 2 | 3 | 4 |

Video encoder 20 and video decoder 30 may also perform context modeling aspects of CABAC. Context modeling provides relatively accurate probability estimation, which is an aspect of achieving high-efficiency coding. Accordingly, context modeling is an adaptive process, and is sometimes described as being "highly adaptive." Different context models can be used for different bins, where the probability of the context models is updated based on the values of previously-coded bins. Bins with similar distributions often share the same context model. Video encoder 20 and/or video decoder 30 may select the context model for each bin based on one or more factors including the type of syntax element, bin position in the syntax element (binIdx), luma/chroma, neighboring information, etc.

Video encoder 20 and video decoder 30 may perform a context switch after each instance of bin coding (bin encoding or bin decoding, as the case may be). Video encoder 20 and video decoder 30 may store the probability models as 7-bit entries (6 bits for the probability state and 1 bit for the most probable symbol (MPS)) in context memory, and may address the probability models using the context index computed by context selection logic. HEVC provides the same probability update method as H.264/AVC. However, HEVC-based context selection logic is modified with respect to the H.264/AVC context selection logic, to improve throughput. Video encoder 20 and video decoder 30 may also use a probability representation for CABAC entropy encoding and decoding, respectively. For CABAC, 64 representative probability values $p_o \in [0.01875, 0.5]$ were derived for the least probable symbol (LPS) by the following recursive equation:

$$p_\sigma = \alpha * p_{\sigma-1} \text{ for all } \sigma = 1, \ldots, 63$$

$$\text{with } \alpha = \left(\frac{0.01875}{0.5}\right)^{1/63}$$

In the equation above, both the chosen scaling factor $\alpha \approx 0.9492$ and the cardinality N=64 of the set of probabilities represent a compromise between the accuracy of probability representation and the adaptation speed. The parameters used in the equation above have shown a relatively good compromise between probability representation accuracy and the desire for faster adaptation. The probability of the MPS is equal to 1 minus the probability of LPS (i.e. (1−LPS)). Therefore, the probability range that could be represented by CABAC is [0.01875, 0.98125]. The upper bound of the range (MPS probability) is equal to one minus the lower bound (i.e., one minus the LPS probability). That is, 1−0.01875=0.98125.

Before encoding or decoding a particular slice, video encoder 20 and video decoder 30 may initialize the probability models based on some pre-defined values. For example, given an input quantization parameter denoted by "qp" and the pre-defined value denoted by "initVal," video encoder 20 and/or video decoder 30 may derive the 7-bit entry of the probability model (denoted by "state" and "MPS") as follows:

qp=Clip3(0, 51, qp);
slope=(initVal>>4)*5−45;
offset=((initVal &15)<<3)−16;
initState=min(max(1, (((slope*qp)>>4)+offset)), 126);
MPS=(initState>=64);
state index=((mpState? (initState−64):(63−initState))<<1)+MPS;

The derived state index implicitly includes the MPS information. That is, when the state index is an even-numbered value, the MPS value is equal to 0. Conversely, when the state index is an odd-numbered value, the MPS value is equal to 1. The value of initVal is in a range of [0, 255] with 8-bit precision.

The pre-defined initVal is slice-dependent. That is, video encoder 20 may use three sets of context initialization parameters for the probability models specifically used for the coding of I slices, P slices, and B slices, respectively. In this way, video encoder 20 is enabled to choose between three initialization tables for these three slice types, such that a better fit for different coding scenarios and/or different types of video content can potentially be achieved.

Recent progress in JEM3.0 includes developments with respect to Intra mode coding. In accordance with these recent developments in JEM3.0, video encoder 20 and video decoder 30 may perform Intra mode coding with 6 most probable modes (MPMs). As described in "Neighbor based intra most probable modes list derivation" by V. Seregin, X. Zhao, A. Said, M. Karczewicz, JVET-C0055, Geneva, May 2016, 33 angular modes in HEVC have been extended to 65 angular modes, plus DC and planar mode with 6 most probable modes (MPMs). Video encoder 20 may encode a one-bit flag (e.g., an "MPM flag") to indicate whether the intra luma mode is included in the MPM candidate list, which includes 6 modes (as described in JVET-00055 cited above). If the intra luma mode is included in the MPM candidate list (thereby causing video encoder 20 to set the MPM flag to a positive value), video encoder 20 may further encode and signal an index of the MPM candidate, to indicate which MPM candidate in the list is the intra luma mode. Otherwise (i.e., if video encoder 20 set the MPM flag to a negative value), then video encoder 20 may further signal the index(es) of the remaining intra luma mode(s).

According to these aspects of the JEM3.0 advancements, video decoder 30 may, upon receiving the signaled encoded video bitstream, decode the MPM flag to determine whether the intra luma mode is included in the MPM candidate list. If video decoder 30 determines that the MPM flag is set to the positive value, then video decoder 30 may decode a received index to identify the intra luma mode from the MPM candidate list. Conversely, if video decoder 30 determines that the MPM flag is set to the negative value, then video decoder 30 may receive and decode the index(es) of the remaining intra luma mode(s).

Recent JEM3.0 progress has also been made with respect to adaptive multiple core transform. In addition to DCT-II and 4×4 DST-VII, which are employed in HEVC, an Adaptive Multiple Transform (AMT) scheme is used for residual coding for both inter-coded and intra-coded blocks. AMT utilizes multiple selected transforms from the DCT/DST families other than the transforms currently defined in HEVC. The newly introduced transform matrices of JEM3.0 are DST-VII, DCT-VIII, DST-I and DCT-V.

For intra residue coding, due to the different residual statistics of different intra prediction modes, video encoder 20 and video decoder 30 may use mode-dependent transform candidate selection processes. Three transform subsets have been defined as shown in Table 4 below, and video encoder 20 and/or video decoder 30 may select the transform subset based on the intra prediction mode, as specified in Table 5 below.

TABLE 4

Three pre-defined transform candidate sets

| Transform Set | Transform Candidates |
|---|---|
| 0 | DST-VII, DCT-VIII |
| 1 | DST-VII, DST-I |
| 2 | DST-VII, DCT-VIII |

TABLE 5

Selected (H)orizontal and (V)ertical transform sets for each Intra prediction mode

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| H | 2 | 1 | 0 | 1 | 0 | 1 | 0 | 1 | 0 | 0 | 0 | 0 | 0 | 1 | 0 | 1 | 0 | 1 |
| V | 2 | 1 | 0 | 1 | 0 | 1 | 0 | 1 | 2 | 2 | 2 | 2 | 2 | 1 | 0 | 1 | 0 | 1 |

TABLE 5-continued

Selected (H)orizontal and (V)ertical transform sets for each Intra prediction mode

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| H | 0 | 1 | 0 | 1 | 0 | 1 | 2 | 2 | 2 | 2 | 2 | 1 | 0 | 1 | 0 | 1 | 0 |
| V | 0 | 1 | 0 | 1 | 0 | 1 | 0 | 0 | 0 | 0 | 0 | 1 | 0 | 1 | 0 | 1 | 0 |

With the sub-set conception, video decoder 30 may first identify a transform subset based on Table 6 below. For instance, to identify the transform subset, video decoder 30 may use the Intra prediction mode of a CU that is signaled with a CU-level AMT flag set to a value of 1. Subsequently, for each of the horizontal and vertical transform, video decoder 30 may select one of the two transform candidates in the identified transform subset, according to Table 7 below. The selected transform candidate for each of the horizontal and vertical transform is selected, based on data explicitly signaled with a flag. For inter prediction residual, however, video decoder 30 may use only one transform set, which consists of DST-VII and DCT-VIII, for all inter modes and for both horizontal and vertical transforms.

TABLE 6

Specification of Chroma Intra Prediction Modes and Associated Names

| | Chroma Intra prediction mode | Primary mode | Chroma intra alternative mode if needed |
|---|---|---|---|
| Default modes | 0 | INTRA_PLANAR | INTRA_ANGULAR66/ |
| | 1 | INTRA_ANGULAR26 | INTRA_ANGULAR65/ |
| | 2 | INTRA_ANGULAR10 | INTRA_ANGULAR64/ |
| | 3 | INTRA_DC | INTRA_ANGULAR63 |
| | 4 | LM | N/A |
| DM modes | 5 | Derived mode $DM_0$ | N/A |
| | 6 | Derived mode $DM_1$ | N/A |
| | ... | ... | N/A |
| | 4 + M | Derived mode $DM_{M-1}$ | N/A |

TABLE 7

Bin string for each chroma mode

| Chroma Intra prediction mode | Bin string | Notes |
|---|---|---|
| 0 | *1 1* 00 | For the first two bins (shown in italics), each bin is coded with one context model. |
| 1 | *1 1* 01 | |
| 2 | *1 1* 10 | |
| 3 | *1 1* 11 | |
| 4 | *1* 0 | |
| 5 | *0 0* | Truncated unary is used to code the DM index (bold italicized digits) |
| 6 | *0* 1 0 | |
| ... | *0* 1 0 | |
| 3 + M | *0* 1 1..1 0 | |
| 4 + M | *0* 1 1..1 1 | |

Recent JEM3.0 progress has been made with respect to LM (linear model) prediction mode for video coding. Video coding devices of this disclosure, such as video encoder 20 and video decoder 30, may process aspects of color space and color format in video encoding and video decoding. Color video plays an essential role in multimedia systems, where various color spaces are used to efficiently represent color. A color space specifies color with numerical values using multiple components. A popular color space is the "RGB" color space, in which color is represented as a combination of three primary color component values (i.e., red, green and blue). For color video compression, the YCbCr color space has been widely used, as described in "Colour space conversions" by A. Ford and A. Roberts, University of Westminster, London, Tech. Rep., August 1998. YCbCr can be converted from the RGB color space relatively easily, via a linear transformation. In an RGB-to-YCbCr conversion, the redundancy between different components, namely the cross-component redundancy, is significantly reduced in the resulting YCbCr color space.

One advantage of YCbCr is the backward compatibility with black-and-white TV, as the Y signal conveys the luminance information. In addition, chrominance bandwidth can be reduced by subsampling the Cb and Cr components in the 4:2:0 chroma sampling format with significantly less subjective impact than subsampling in RGB. Because of these advantages, YCbCr has been the major color space in video compression. There are also other color spaces, such as YCoCg, used in video compression. For purposes of illustration, regardless of the actual color space used, the Y, Cb, Cr signals are used to represent the three color components in the video compression scheme throughout this disclosure. In 4:2:0 sampling, each of the two chroma arrays (Cb and Cr) has half the height and half the width of the luma array (Y).

Figure 8:
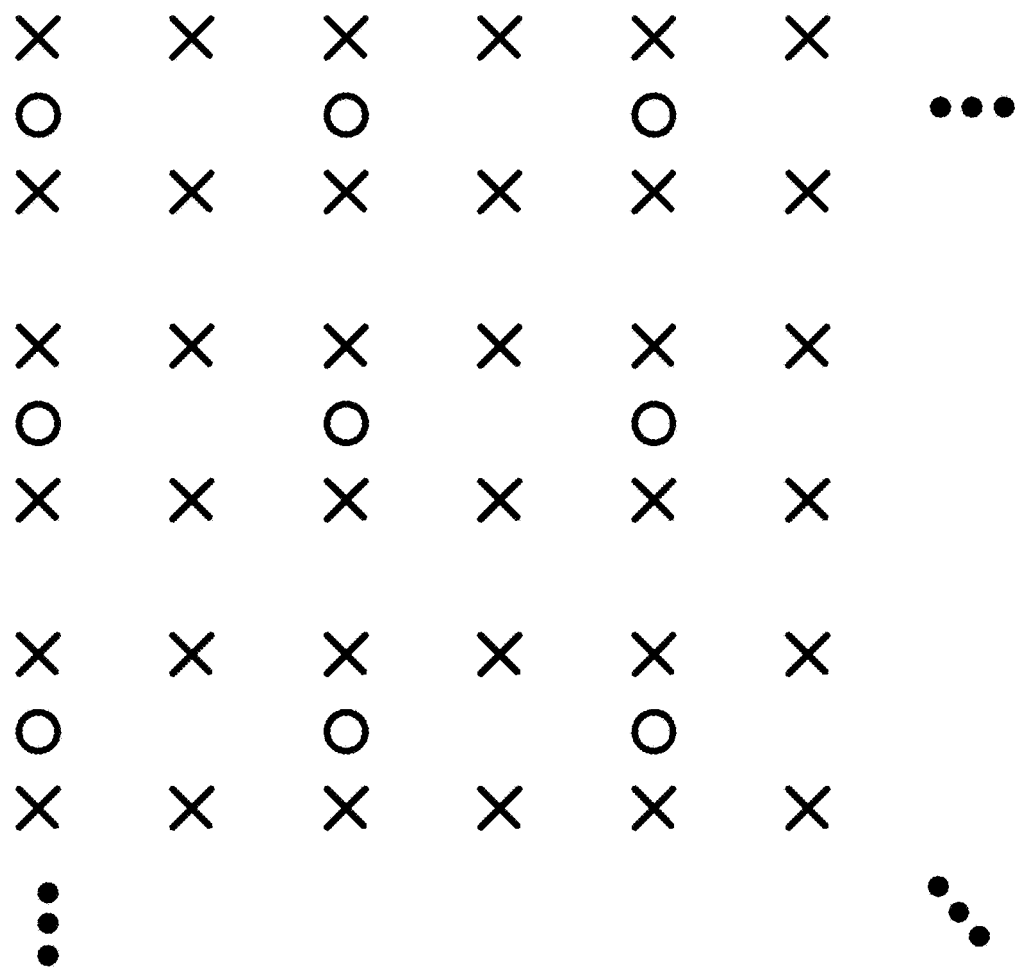
FIG. 8 is a conceptual diagram illustrating an example of nominal vertical and horizontal locations luma and chroma samples in a picture.

FIG. 8 is a conceptual diagram illustrating an example of nominal vertical and horizontal locations luma and chroma samples in a picture. The nominal vertical and horizontal relative locations of luma and chroma samples in pictures are shown in FIG. 8 generally correspond to locations as provided by the of 4:2:0 sampling format.

Aspects of the LM prediction mode for video coding are discussed in the following paragraphs. Although the cross-component redundancy is significantly reduced in the YCbCr color space, correlation between the three color components still exists in the YCbCr color space. Various techniques have been studied to improve the video coding performance by further reducing the correlation between the color components. With respect to 4:2:0 chroma video coding, the Linear Model (LM) prediction mode was studied during the development of the HEVC standard. Aspects of the LM prediction mode are described in "CE6.a.4: Chroma intra prediction by reconstructed luma samples" by J. Chen, V. Seregin, W.-J. Han, J.-S. Kim, and B.-M. Joen, Joint Collaborative Team on Video Coding (JCT-VC) of ITU-T SG16 WP3 and ISO/IEC JTC1/SC29/WG11, JCTVC-E266, 5th Meeting: Geneva, 16-23 Mar. 2011. When performing prediction according to the LM prediction mode, video encoder 20 and video decoder 30 may predict the chroma samples based on downsampled reconstructed luma samples of the same block by using the linear model shown in equation (1) below:

$$\text{pred}_C(i,j) = \alpha \cdot \text{rec}_L(i,j) + \beta \quad (1)$$

where $\text{pred}_C(i, j)$ represents the prediction of chroma samples in a block and $\text{rec}_L(i, j)$ represents the downsampled reconstructed luma samples of the same block. Parameters $\alpha$ and $\beta$ are derived from causal reconstructed samples around the current block.

Figure 9:
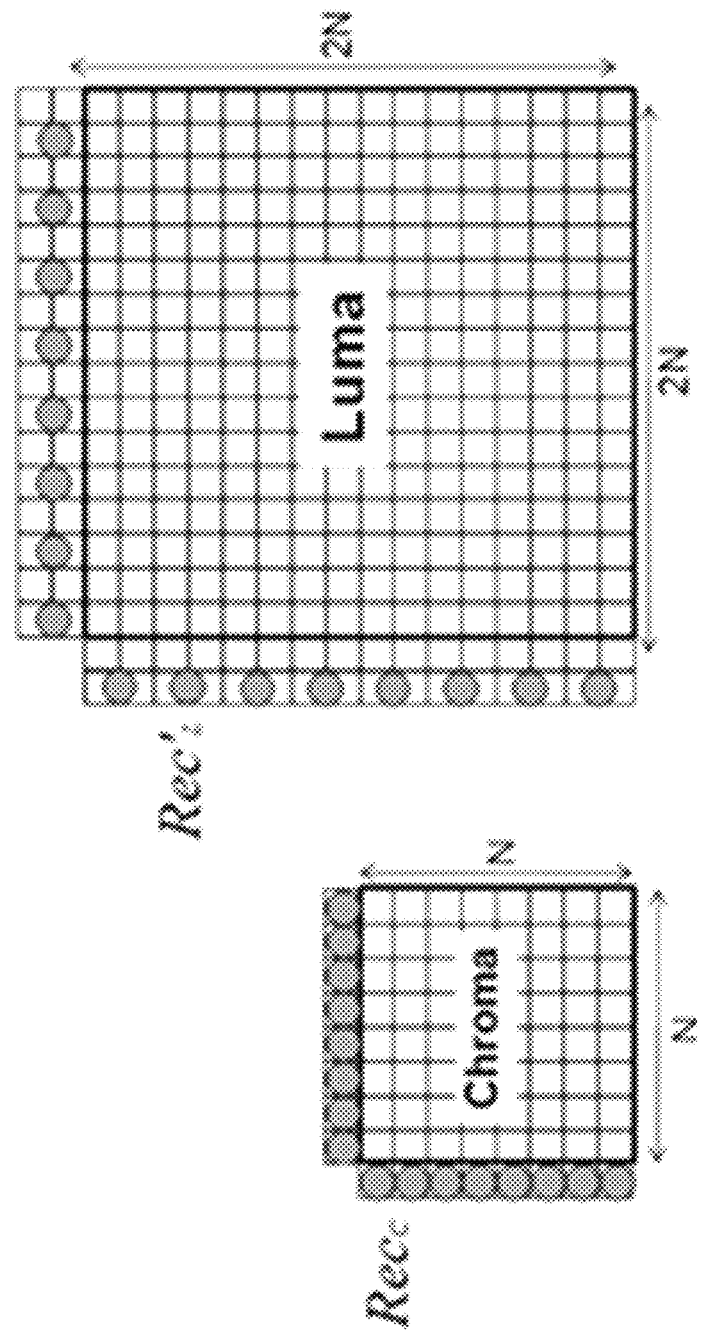
FIG. 9 is a conceptual diagram illustrating locations of the samples used for the derivation of parameters used in prediction according to the linear model (LM) mode.

FIG. 9 is a conceptual diagram illustrating locations of the samples used for the derivation of parameters used in prediction according to the linear model (LM) mode. The example of selected reference samples depicted in FIG. 9 pertains to the derivation of $\alpha$ and $\beta$ as used in equation (1) above. If the chroma block size is denoted by N×N where N is an integer, then both i and j are within the range [0, N].

Video encoder 20 and video decoder 30 may derive parameters $\alpha$ and $\beta$ in equation (1) by reducing or potentially minimizing regression error between the neighboring reconstructed luma and chroma samples around the current block, according to equation (2) below.

$$E(\alpha, \beta) = \sum_i (y_i - (\alpha \cdot x_i + \beta))^2 \quad (2)$$

The parameters $\alpha$ and $\beta$ are solved as follows:

$$\alpha = \frac{I \sum x_i \cdot y_i - \sum x_i \cdot \sum y_i}{I \sum x_i \cdot x_i - \sum x_i \cdot \sum x_i} \quad (3)$$

$$\beta = \left(\sum y_i - \alpha \cdot \sum x_i\right) / I \quad (4)$$

where $x_i$ represents a downsampled reconstructed Luma reference sample, $y_i$ represents reconstructed Chroma reference samples, and I represents an amount (e.g., a count) of the reference samples. For a target N×N chroma block, when both left and above causal samples are available, the number of total involved samples (I) is equal to 2N. When only left or above causal samples are available, the number of total involved samples (I) is equal to N.

In summary, when LM prediction mode is applied, video encoder 20 and/or video decoder 30 may invoke the following steps in the order listed below:
 a) Downsample the neighboring luma samples;
 b) Derive the linear parameters (i.e., $\alpha$ and $\beta$); and
 c) Downsample the current luma block and derive the prediction from the downsampled luma block and linear parameters.

To further improve the coding efficiency, video encoder 20 and/or video decoder 30 may utilize downsampling filters of (1, 2, 1) and (1, 1) to derive neighboring samples $x_i$ and downsampled luma samples $\text{rec}_L(i, j)$ within the corresponding luma block.

Recent JEM3.0 progress has also been made with respect to prediction between chroma components. In JEM, the LM prediction mode is extended to the prediction between two chroma components. For example, the Cr component may be predicted from the Cb component. Instead of using the reconstructed sample signal, video encoder 20 and/or video decoder 30 may apply the cross component prediction in the residual domain. For instance, video encoder 20 and/or video decoder 30 may implement the residual domain application of cross-component prediction by adding a weighted reconstructed Cb residual to the original Cr intra prediction, to form the final Cr prediction. An example of this operation is shown in equation (3) below:

$$\text{pred}^*_{Cr}(i,j) = \text{pred}_{Cr}(i,j) + \alpha \cdot \text{resi}_{Cb}'(i,j) \quad (3)$$

Video encoder 20 and/or video decoder 30 may derive the scaling factor $\alpha$ as it would be derived in LM mode. However, one difference is the addition of a regression cost relative to a default $\alpha$ value in the error function, so that the derived scaling factor is biased towards the default value (−0.5). LM prediction mode is added as one additional chroma intra prediction mode. In this regard, video encoder 20 may add one more RD cost check for chroma component for selecting the chroma intra prediction mode.

Aspects of the quad-tree-binary-tree (QTBT) structure are described in the following paragraphs. In VCEG proposal COM16-C966 ("Block partitioning structure for next generation video coding" by J. An, Y.-W. Chen, K. Zhang, H. Huang, Y.-W. Huang, and S. Lei, International Telecommunication Union, COM16-C966, September 2015), the QTBT partitioning scheme was proposed for future video coding standards beyond HEVC. Simulations showed the QTBT structure proposed in COM16-C966 is more efficient than the quad-tree structure used in HEVC. In the proposed QTBT structure of COM16-C966, a coding tree block (CTB) is first partitioned according to the quad-tree structure, where the quad-tree splitting of one node can be iterated until the node reaches the minimum allowed quad-tree leaf node size (MinQTSize).

According to the QTBT structure, if the quad-tree leaf node size is not larger than the maximum allowed binary tree root node size (MaxBTSize), the quad-tree leaf node can be further partitioned according to a binary tree structure. The binary tree splitting of a given node can be iterated until the node reaches the minimum allowed binary tree leaf node size (MinBTSize) or until the iterative splitting reaches a maximum allowed binary tree depth (MaxBTDepth). The binary tree leaf node is, namely, a CU which can be used for prediction (e.g. intra-picture or inter-picture prediction) and transform without any further partitioning.

In accordance with binary tree splitting, video encoder 20 and/or video decoder 30 may implement two splitting types, namely, symmetric horizontal splitting and symmetric vertical splitting. In one example of the QTBT partitioning structure, the CTU size is set as 128×128 (that is, 128×128 luma samples and two corresponding 64×64 chroma samples), the MinQTSize is set as 16×16, the MaxBTSize is set as 64×64, the MinBTSize (for both width and height) is set as 4, and the MaxBTDepth is set as 4. Video encoder 20 and/or video decoder 30 may apply the quadtree partitioning portion of the QTBT scheme to the CTU first, to generate quad-tree leaf nodes. The quad-tree leaf nodes may have a size from 16×16 (i.e., the MinQTSize) to 128×128 (i.e., the CTU size).

If the leaf quad-tree node is 128×128, video encoder 20 and/or video decoder 30 may not further split the leaf quad-tree node using the binary tree portion of the QTBT scheme, because the node size exceeds the MaxBTSize (in this case, 64×64). Otherwise (i.e. if the node size does not exceed the MaxBTSize of 64×64), video encoder 20 and/or video decoder 30 may further partition the leaf quad-tree node using the binary tree partitioning portion of the QTBT structure. Therefore, the quad-tree leaf node is also the root node for the binary tree portion of the QTBT scheme, and thus, has a binary tree depth of 0. When iterative binary-tree partitioning reaches causes the binary tree depth to reach the MaxBTDepth (i.e., 4), video encoder 20 and/or video decoder 30 perform no further splitting of any kind with respect to the leaf node. When the binary tree portion of the QTBT scheme results in a binary tree node that has a width equal to the MinBTSize (i.e. 4), video encoder 20 and/or video decoder 30 may perform no further horizontal splitting of the node. Similarly, when the binary tree portion of the QTBT scheme results in a binary tree node that has a height equal to MinBTSize (i.e., 4), video encoder 20 and/or video decoder 30 may perform no further vertical splitting of the node. The leaf nodes of the binary tree portion of the QTBT scheme (if the partitioning reaches binary tree partitioning at all) are, namely, CUs further processed by prediction and transform without any further partitioning.

Figure 10:
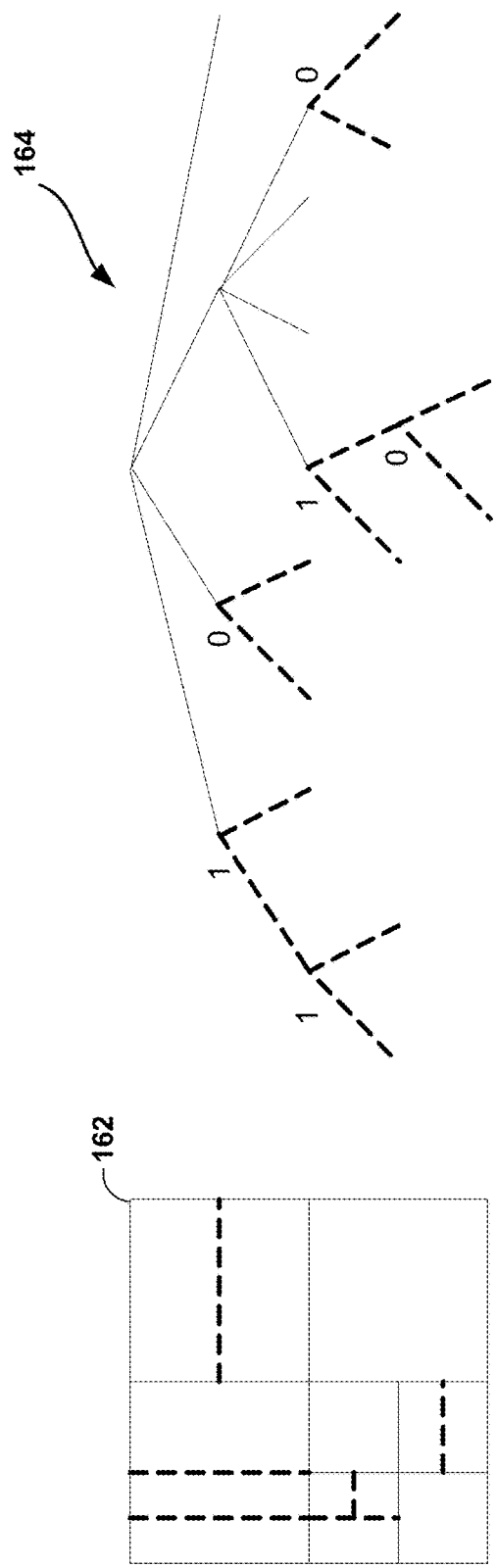
FIG. 10 is a conceptual diagram illustrating a quad tree binary tree (QTBT) structure.

FIG. 10 is a conceptual diagram illustrating aspects of the QTBT partitioning scheme. The block diagram on the left side of FIG. 10 illustrates an example of partitioning of a block 162 according to the QTBT partitioning structure. Quad-tree partitioning aspects of the QTBT partitioning scheme are illustrated using solid lines in block 162, while the binary-tree partitioning aspects of the QTBT partitioning scheme are illustrated using dashed lines in block 162. Block 162 is partitioned into square leaf nodes in cases where only the quad-tree portion of the QTBT scheme is invoked, and into non-square rectangular leaf nodes in any case where the binary-tree portion of the QTBT scheme is invoked (whether or not it is invoked in combination with the quad-tree partitioning portion). In contrast to the partitioning techniques of HEVC, in which multiple transforms are possible, the QTBT partitioning scheme provides for a system by which the PU size is always equal to the CU size.

The schematic drawing on the right side of FIG. 10 illustrates tree structure 164. Tree structure 164 is the corresponding tree structure for the partitioning illustrated with respect to block 162 in FIG. 10. In the case of tree structure 164 as well, the solid lines indicate quad-tree splitting, and dashed lines indicate binary tree splitting, within the auspices of the QTBT partitioning scheme of FIG. 10. For each splitting (i.e., non-leaf) node of the binary tree portions illustrated using dashed lines in tree structure 164, video encoder 20 may signal a respective one-bit flag to indicate which splitting type (i.e., horizontal or vertical) is used. According to some implementations of QTBT partitioning, video encoder 20 may set the flag to a value of zero (0) to indicates horizontal splitting, and to a value of one (1) to indicate vertical splitting. It will be appreciated that, for the quad-tree splitting portions of the QTBT partitioning structure, there is no need to indicate the splitting type, because quad-tree splitting always splits a block horizontally and vertically into 4 sub-blocks with an equal size.

Figure 11B:
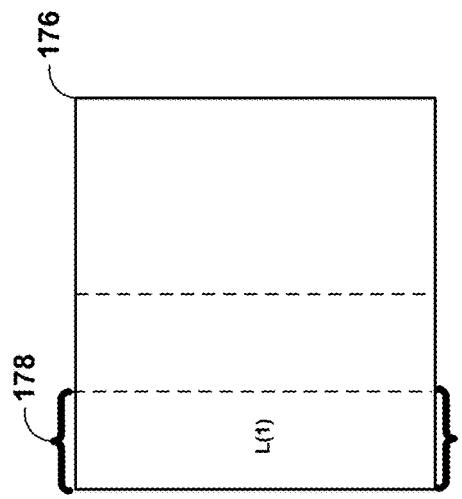
FIGS. 11A and 11B illustrate an example of separate partitioning structures for corresponding luma and chroma blocks according to the QTBT partitioning scheme.
Figure 11A:
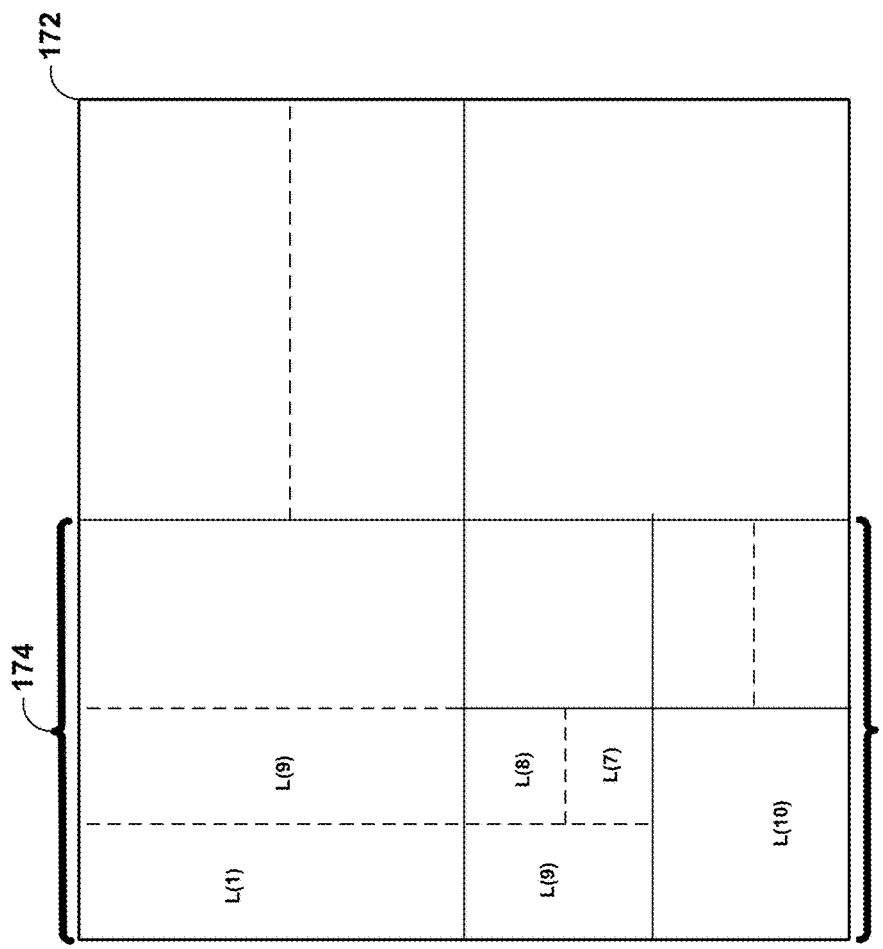

FIGS. 11A and 11B illustrate an example of separate partitioning structures for corresponding luma and chroma blocks according to the QTBT partitioning scheme. QTBT block partitioning technology permits for and supports the feature of corresponding luma and chroma blocks having separate QTBT-based partitioning structures. Under the QTBT partitioning scheme, for P slices and B slices, corresponding luma and chroma CTUs in one CTU share the same QTBT-based partitioning structure. For an I slice, however, the luma CTU can be partitioned into CUs by a first QTBT-based partitioning structure, and the chroma CTUs are partitioned into chroma CUs by a second QTBT-based partitioning structure that may or may not be different from the first QTBT-based partitioning structure. Thus, a CU in an I slice may consist of a coding block of a luma component or coding blocks of two chroma components, while for a CU in a P and B slice, the CU may consist of coding blocks of all three color components.

The separate tree structure supported by QTBT for I slices includes aspects that relate to chroma coding. For instance, JEM allows for six (6) chroma modes per PU. Use of the DM mode indicates that video encoder 20 and/or video decoder 30 utilize the same prediction mode for the chroma PU as for the corresponding luma PU. As described above, for I slices, the QTBT-based partitioning structure for a luma block and the corresponding chroma may be different. As such, when DM mode is used in an I slice, video encoder 20 and/or video decoder 30 may inherit the luma prediction mode of the PU covering the top-left position to perform prediction for the chroma PU(s). In contrast to the partitioning techniques of HEVC, in which a luma block and its corresponding chroma block(s) always share the same tree structure, the QTBT-based partitioning of JEM3.0 permits for the possible difference between luma and chroma tree structures as shown in FIGS. 11A and 11B.

FIGS. 11A and 11B illustrate examples of QTBT partitioning structures of one CTU in an I slice. FIG. 11A illustrates a luma block 172, with the left partition 174 called out using upper and lower bookending braces. FIG. 11B illustrates corresponding chroma block 176, with the left partition 178 called out using upper and lower bookending braces. The respective left partitions 174 and 178 include finer partitions, as shown in FIGS. 11A and 11B. L(i), where "i" represents the respective integer value illustrated within the respective partition, indicates that the luma intra prediction mode for the respective partition has an index equal to i. In the examples illustrated in FIGS. 11A and 11B, video encoder 20 and/or video decoder 30 may encode/decode the left partition of chroma block 176 with the DM mode. Thus, video encoder 20 and/or video decoder 30 may choose the LM mode from the top-left corresponding luma block partition to predict left partition 178 of chroma block 176. In the use case scenario illustrated in FIGS. 11A and 11B, video encoder 20 and/or video decoder 30 may select the intra prediction mode with the index equal to 1 to encode/decode left partition 178 of chroma block 176, because 'i' has a value of 1 in the top-left partition of luma block 172.

Table 7 above specifies the mode arrangement that video encoder 20 may use for signaling the chroma mode. In order to remove the possible redundancy in chroma mode signaling that may arise when the derived mode (DM) refers to one of the modes always present, video encoder 20 may use angular (66 when there are 67 intra modes in total) mode to substitute the duplicate mode as shown in Table 7.1 below. In the use case scenario illustrated in Table 7.1 below, the angular mode (denoted as INTRA_ANGULAR66) is referred to as an "alternative mode."

TABLE 7.1

Specification of Chroma Intra Prediction Modes and Associated Names

| Chroma Intra prediction mode | | Primary mode | Chroma intra alternative mode, if default mode is equal to the derived mode |
|---|---|---|---|
| Default modes | 0 | INTRA_PLANAR | INTRA_ANGULAR66 |
| | 1 | INTRA_ANGULAR50 | INTRA_ANGULAR66 |
| | 2 | INTRA_ANGULAR18 | INTRA_ANGULAR66 |
| | 3 | INTRA_DC | INTRA_ANGULAR66 |
| | 4 | LM | N/A |
| | 5 | Derived mode (DM) | N/A |

As discussed above, video encoder 20 and video decoder 30 may perform entropy coding of chroma prediction modes. In chroma mode coding, a 1-b syntax element (0) is assigned to the most often occurring derived mode, two bins (10) are assigned to LM mode while 4-b syntax elements (1100, 1101, 1110, 1111) are assigned to the remaining four modes. The first two bins are coded with one context model and the remaining two bins (if needed) are bypass coded.

TABLE 7.2

Bin string for each chroma mode

| Chroma Intra prediction mode | Bin string | Note |
|---|---|---|
| 0 | *1 1* 00 | For the first two bins (shown in italics), each bin is coded with one context model. |
| 1 | *1 1* 01 | |
| 2 | *1 1* 10 | |
| 3 | *1 1* 11 | |
| 4 | *1* 0 | |
| 5 | *0* | |

Techniques of this disclosure are directed to improving the performance of various technologies discussed above. As described above, JEM3.0 supports separate tree structures for chroma block partitioning and luma block partitioning for the same CTU. However, one chroma PU may correspond to multiple luma PUs. Only inheriting one of the luma intra prediction modes from the multiple luma PUs for chroma coding, according to the QTBT partitioning aspects of JEM3.0, may provide sub-optimal results, which can be improved or potentially optimized by various techniques of this disclosure. Additionally, the total number of possible chroma modes is six (6) for a given PU in JEM. However, for luma coding, the total number of possible modes is sixty-seven (67). Various techniques of this disclosure may improve coding efficiency by increasing the total number of chroma modes.

Various techniques of this disclosure are listed in an itemized fashion below. It will be appreciated that video encoder 20 and/or video decoder 30 may apply various techniques discussed below individually, or in various combinations of two or more of the described techniques. While described as being performed by video encoder 20 and/or video decoder 30, it will be appreciated that one or more components of video encoder 20 illustrated in FIG. 2 and/or one or more components of video decoder 30 illustrated in FIG. 3 may perform the various techniques of this disclosure.

The description below denotes the size of one chroma block as W*H (where 'W' is the width and 'H' is the height of the chroma block). The position of the top-left pixel in the chroma block relative to the whole slice is denoted by the tuple (x, y), where 'x' and 'y' are the horizontal and vertical offsets, respectively. The luma block corresponding to a given chroma block has a size equal to 2W*2H (for the 4:2:0 color format) or W*H (for the 4:4:4 color format). The position of the top-left pixel in the corresponding luma block relative to the whole slice is denoted by the tuple (2x, 2y) (for 4:2:0) or (x, y) (for 4:4:4). The examples given below are described with respect to 4:2:0 color format. It will be appreciated that the techniques described herein can be extended to other color formats, as well.

According to certain aspects of this disclosure, multiple DM modes may be added with respect to chroma coding, thereby increasing the number of available chroma encoding and decoding modes available (from luma blocks) to video encoder 20 and video decoder 30. That is, according to these aspects of this disclosure, video encoder 20 and video decoder 30 may have a greater number of DM options than the single option to inherit the coding mode used for the corresponding luma block. For example, according to the techniques of this disclosure, video encoder 20 and/or video decoder 30 may generate a candidate list containing DM intra prediction modes for a chroma block based on the intra prediction modes used in the corresponding luma block.

While preserving coding and bandwidth efficiencies by maintaining the same total number of possible chroma modes in the DM candidate list, the techniques of this disclosure directed to applying multiple DMs provide potential precision enhancements, because the DMs provide better accuracy than the default modes used in the existing techniques.

In this example, video encoder 20 may signal chroma modes as currently set forth in JEM3.0. However, if video encoder 20 selects the DM mode for chroma coding of a chroma block, then video encoder 20 may implement additional signaling. More specifically, according to this example, video encoder 20 may encode and signal a flag that indicates that the DM mode was selected for the encoding of the chroma block. Based on the chroma block having been encoded in the DM mode, video encoder 20 may encode and signal an index value, to indicate which mode of the candidate list was used as the DM mode. Video encoder 20 may encode and signal an index value between zero (0) and five (5), based on the size of the candidate list. That is, video encoder 20 may generate a candidate list of chroma prediction modes that includes a total of six (6) candidates, i.e., resulting in a candidate list size of six (6).

Based on receiving the flag set to a value that indicates that an encoded chroma block was encoded using a DM mode, video decoder 30 may determine that the decoding mode for the chroma block is included in the candidate list. In turn, video decoder 30 may receive and decode an index that identifies an entry in the chroma mode candidate list. Based on the flag indicating that the encoded chroma block was encoded using the DM mode, and using the index value received for the encoded chroma block, video decoder 30 may select, from the chroma mode candidate list, a particular mode to use for decoding the chroma block. In this way, video encoder 20 and video decoder 30 may increase the number of candidate modes that can be used for encoding and decoding of a chroma block, in instances where the DM mode is selected for the coding of the chroma block. Video decoder 30 may decode an index value between zero (0) and five (5), based on the size of the candidate list. That is, video decoder 30 may generate a candidate list of chroma prediction modes that includes a total of six (6) candidates, i.e., resulting in a candidate list size of six (6).

In some examples, video encoder 20 may first encode and signal a flag to indicate whether the chroma block is encoded in a linear model (LM) mode. In these examples, video encoder 20 may follow the signaled flag (to indicate whether or not the chroma block is LM-encoded) with data indicating all of the DM candidates in the candidate list. According to this implementation, video decoder 30 may receive, in the encoded video bitstream, the encoded flag indicating whether or not the chroma block is encoded in the LM mode. Video decoder 30 may parse, from positions beginning subsequently to the LM flag in the encoded video bitstream, data indicating all of the DM candidates in the candidate list. It will thus be appreciated that, according to various examples of this disclosure, video decoder 30 may either construct a DM candidate list, or alternatively, may receive the entire DM candidate list in the encoded video bitstream. Video decoder 30 may use a signaled index to select the appropriate DM mode from the candidate list, in either scenario.

Video encoder 20 may also implement pruning with respect to the DMs of the DM candidate list. That is, video encoder 20 may determine whether or not two of the DMs included in the list are identical. If video encoder 20 determines that multiple instances of a single DM (i.e., multiple identical DMs) are included in the candidate list, then video encoder 20 may remove redundancy by removing all except one instance of the same DM. That is, video encoder 20 may prune the list such that exactly one instance of such an identical DM remains in the candidate list.

In some examples of the DM candidate list-based techniques of this disclosure, video encoder 20 may prune the DM candidates in the candidate list against one or more of the default modes. In accordance with the pruning techniques of this disclosure, if video encoder 20 determines that one of the default modes (for instance, the K-th mode in the default mode list) is identical to one of the DM modes in the DM candidate list, video encoder 20 may replace such a DM mode in the candidate list with the alternative mode. In addition to replacing the pruned DM mode in the candidate list, video encoder 20 may set the alternative mode to the mode with index equal to a value of ((max Intra Mode Index)−1−K). In some implementations in which video encoder 20 signals data indicating all of the DM modes included in the candidate list, video encoder 20 may signal data that reflects the pruned DM candidate list.

In some examples where video decoder 30 also performs DM candidate list construction, video decoder 30 may also perform pruning to finalize the DM candidate list. For instance, if video decoder 30 determines that one of the default modes (for instance, the K-th mode in the default mode list) is identical to one of the DM modes in the DM candidate list, video decoder 30 may replace such a DM mode in the candidate list with the alternative mode. In addition to replacing the pruned DM mode in the candidate list, video decoder 30 may set the alternative mode to the mode with index equal to a value of ((max Intra Mode Index)−1−K).

By implementing to one or more of the DM candidate list-based techniques described above, video encoder 20 and video decoder 30 may increase the number of possible chroma prediction modes. The increased number of chroma modes available via the DM candidate list-based techniques described above may improve coding efficiency while maintaining precision. As described above, in various examples, video decoder 30 may receive the entire DM candidate list via the encoded video bitstream. Or alternatively, may construct the DM candidate list and use a signaled index to select a prediction mode from the DM candidate list with respect to a chroma block. Because video decoder 30 may either receive an explicitly-signaled DM candidate list, or alternatively construct the DM candidate list, various DM candidate list-based techniques are described herein as being performed by video encoder 20 and optionally, by video decoder 30.

In some examples, video encoder 20 may fix the size of the DM candidate list (i.e., the total number of candidates included in the DM candidate list) within a particular universe, such as within a tile, within a slice, within a picture, or within a sequence. In some such examples, if video decoder 30 is configured to construct the DM candidate list and use a signaled index to select a candidate, video decoder 30 may also fix the size of the DM candidate list (i.e., total number of candidates included in the DM candidate list) within a particular universe, such as within a tile, within a slice, within a picture, or within a sequence.

In some examples, video encoder 20 may signal the size of the candidate list in a metadata-containing data structure that can be signaled out of band with respect to the corresponding encoded video data. As some non-limiting examples, video encoder 20 may signal the size of the candidate list in any of a slice header, a picture parameter set(PPS), or a sequence parameter set(SPS). According to some examples, video encoder 20 (and optionally, video decoder 30) may be configured to pre-define the size of the candidate list such that the size of the candidate list is the same for all block sizes. Alternatively, video encoder 20 (and optionally, video decoder 30) may be configured to pre-define the size of the candidate list such that the size of the candidate list varies dependent on size of blocks.

According to some examples, video encoder 20 (and optionally, video decoder 30) may construct the DM candidate list to include (e.g., contain) up to three parts. In these examples, the three parts of the DM candidate list include the following: (i) a first part that includes candidates of luma intra prediction modes associated with specific positions relative to the corresponding luma block; (ii) a second part that includes candidates which are derived from a function of all luma blocks within the corresponding luma block, e.g., the most frequently used luma intra prediction mode as described in one example above; and (iii) a third part that includes candidates derived from selected luma intra prediction mode with a certain offset of mode indices.

In one example, video encoder 20 (and optionally, video decoder 30) may insert the candidates from the first two parts into the DM candidate list in order until the total number of candidates is equal to the pre-defined list size (i.e. the pre-defined total number of DM modes). After performing a pruning process with respect to the modes included in the DM candidate list, if the size of the candidate list is still smaller than the pre-defined total number of DM modes, video encoder 20 (and optionally, video decoder 30) may insert the candidates from the third part of the list. In one such example, video encoder 20 (and optionally, video decoder 30) may insert the candidates from the three parts (or two parts, depending on the results of pruning) into the candidate list in the order of the first part, followed by the second part, followed by the third part. In another alternative example, video encoder 20 (and optionally, video decoder 30) may insert candidates from the second part before those from the first part. In yet another alternative example, video encoder 20 (and optionally, video decoder 30) may insert candidates from the second part among those from the first part (e.g., by interleaving or interweaving the candidates of the first and second parts).

According to some examples, the candidates of the first part of the DM candidate list are modes inherited from specific positions for coding of the corresponding luma block. For instance, the first part of the candidate list may include modes inherited from the following positions in the corresponding luma block: the center position, the top-left position, the top-right position, the below-left position, and the below-right position. That is, in this example, the first part of the candidate list may include modes inherited from the four corners of the corresponding luma block. In one such example, video encoder 20 (and optionally, video decoder 30) may insert the modes inherited from the four corner positions of the corresponding luma block to the DM candidate list in the following order: center, top-left, top-right, below-left and below-right. In another such example, video encoder 20 (and optionally, video decoder 30) may insert the modes inherited from the four corner positions of the corresponding luma block to the DM candidate list in the following order: center, top-left, below-right, below-left and top-right. In other examples, the order may vary, and it will be appreciated that the orders described above are non-limiting examples.

In one example, video encoder 20 (and optionally, video decoder 30) may form the first part of the DM candidate list to include the intra prediction modes of all positions of the corresponding luma block. In this example, the second part may become unnecessary, because the first part includes all of the intra prediction modes of the corresponding luma block. Additionally, video encoder 20 (and optionally, video decoder 30) may traverse all the units within the corresponding luma block in a certain order. Alternatively, or in addition, video encoder 20 (and optionally, video decoder 30) may add the added mode to the DM candidate list in an order that is based on a decreasing number of occurrence within the corresponding luma block.

In one example, video encoder 20 (and optionally, video decoder 30) may, to form the third part, apply an offset to the first one or more candidates which have been inserted to the list. In addition, in forming the third part, video encoder 20 (and optionally, video decoder 30) may further apply or perform pruning of the inserted candidates. In one alternative example, video encoder 20 (and optionally, video decoder 30) may form the third part to include one or more intra chroma modes from neighboring blocks.

According to some implementations of the techniques described herein, video encoder 20 (and optionally, video decoder 30) may adaptively change the size of the candidate list from CU to CU, or from PU to PU, or from TU to TU. In one example, video encoder 20 (and optionally, video decoder 30) may add only the candidates from the first part, as described with respect to the three-part DM candidate list formation implementation. Alternatively, video encoder 20 (and optionally, video decoder 30) may add only the candidates from the first and second parts to the DM candidate list. In some examples, video encoder 20 (and optionally, video decoder 30) may perform pruning to remove identical intra prediction modes. III.

In examples in which video encoder 20 prunes the DM candidate list, if the number of candidates in the final post-pruning DM candidate list is equal to 1, video encoder 20 may not signal the DM index. In some examples, video encoder 20 (and optionally, video decoder 30) may binarize the DM index values within the DM candidate list using truncated unary binarization. Alternatively, video encoder 20 (and optionally, video decoder 30) may binarize the DM index values within the DM candidate list using unary binarization.

In some examples, video encoder 20 (and optionally, video decoder 30) may set the context model index equal to the bin index. Alternatively, the total number of context models for coding the DM index values may be smaller than the maximum candidate number. In this case, video encoder 20 may set the context model index equal to min (K, bin index) where K represents a positive integer. Alternatively, video encoder 20 may encode only the first few bins with context models, and may encode the remaining bins with bypass mode. In this example, video decoder 30 may decode only the first few bins with context models, and may decode the remaining bins with bypass mode.

Alternatively, video encoder 20 (and optionally, video decoder 30) may make the number of context coded bins dependent on the total number of DM candidates, or on one or more of CU, PU, or TU size. Alternatively, for the first M bins (e.g., M is equal to 1), the context modeling may be further dependent on the total number of DM candidates in the final (e.g., post-pruning) DM candidate list, or on CU/PU/TU size, or on the splitting information of the corresponding luma block.

In some examples, video encoder 20 (and optionally, video decoder 30) may further reorder the candidates in the candidate list before binarization. In one example, when the width of the CU/PU/TU is larger than the height of the CU/PU/TU, the re-ordering may be based on the intra prediction mode index difference between the real intra mode for the candidate and the horizontal intra prediction mode. The smaller the difference, the smaller the index that will be assigned to the candidate in the DM candidate list will be assigned. In another example, when the height of the CU/PU/TU is larger than the width of the CU/PU/TU, the re-ordering may be based on the intra prediction mode index difference between the real intra mode for the candidate and the vertical intra prediction mode. In this example as well, the smaller the difference, the smaller the index that will be assigned for the candidate in the DM candidate list.

Alternatively, furthermore, video encoder 20 (and optionally, video decoder 30) may perform pruning of all the DM candidates in the list against the default modes. If one of the default modes (e.g., the K-th mode in the default mode list) is identical to one of the DM mode in the DM candidate list, video encoder 20 (and optionally, video decoder 30) may replace such a DM mode in the DM candidate list with the with the alternative mode. In addition to replacing the pruned DM mode in the candidate list, video encoder 20 (and optionally, video decoder 30) may set the alternative mode to the mode with index equal to a value of ((max Intra Mode Index)−1−K).

According to some techniques of this disclosure, video encoder 20 and video decoder 30 may unify the luma and chroma intra prediction modes. That is, for each chroma block, video encoder 20 and/or video decoder 30 may select a prediction mode from a pool of the available luma prediction modes, in addition to the linear model (LM) mode and other modes that particular to the coding of chroma components. The pool of available luma prediction modes is described herein as including a total of 'N' prediction modes, where 'N' represents a positive integer value. In some examples, the value of 'N' is equal to sixty-seven (67), corresponding to 67 different available luma prediction modes.

Additionally, video encoder 20 may also signal a most probable mode (MPM) flag and, depending on the value of the MPM flag, an MPM index (corresponding to the index of the MPM candidate in an MPM candidate list) with respect to the encoding and signaling of chroma intra prediction modes. For example, video encoder 20 may construct the MPM candidate list by first adding one or more DM modes for the chroma block to the MPM candidate list. As described above, video encoder 20 may identify multiple DM modes for the chroma block. However, it will be appreciated that, in some scenarios, video encoder 20 may identify a single DM mode for the chroma block. After adding the DM mode(s) to the MPM candidate list, video encoder 20 may add other chroma modes from neighboring blocks to the MPM candidate list. Alternatively, or in addition, video encoder 20 may add default modes, such as by using luma MPM candidate list construction processes described in "Neighbor based intra most probable modes list derivation" by V. Seregin, X. Zhao, A. Said, M. Karczewicz, JVET-C0055, Geneva, May 2016 (hereinafter, "Seregin").

Alternatively, video encoder 20 may construct the chroma MPM candidate list in the same was as for a luma mode MPM candidate list. For instance, video encoder 20 may check several neighboring blocks in an order described in Seregin. In these implementations, video encoder 20 may process the LM mode and/or other chroma-specific intra prediction modes in the same way as video encoder 20 processes other intra prediction modes. Moreover, video encoder 20 may prune the MPM candidate list to remove redundancies arising from identical intra prediction modes being added from multiple sources.

In one example, video encoder 20 may first signal a flag to indicate the usage of one or more chroma-specific modes that are only applied to chroma components, such as the LM mode and/or other prediction modes that are only used for coding of chroma components. If the selected prediction mode is not a chroma-specific mode (i.e., video encoder 20 sets the above-described flag to a disabled state), then video encoder 20 may further signal an MPM flag. In this example implementation, when adding chroma prediction modes inherited from a neighboring block to the MPM list, video encoder 20 may not consider chroma-specific modes (e.g., the LM mode), if such a chroma-specific mode is taken from a neighboring block.

An example use case of this implementation is described below. Video encoder 20 may intra-predict the chroma block using the LM mode, and therefore, may signal an LM flag set to an enabled state. Based on the chroma block having been encoded using the LM prediction mode, video encoder 20 may signal an MPM index that indicates a position within the MPM candidate list for the chroma block. This example use case illustrates that video encoder 20 may use a one-bit flag to first provide video decoder 30 an indication of whether or not the prediction mode for the chroma block is a candidate in the MPM candidate list at all. If and only if the prediction mode used for the chroma block is a candidate from the MPM candidate list, then video encoder 20 may signal the index to indicate to video decoder 30 which mode of the MPM candidate list is used to predict the chroma block. In this manner, video encoder 20 may conserve bandwidth by first using a one-bit flag, and then based on the value of the flag, determining whether or not to signal an index value at all.

Decoder-side aspects of the above-described techniques are discussed below. Video decoder 30 may receive an MPM flag in the encoded video bitstream. If the value of the MPM flag is set to an enabled state, then video decoder 30 may also receive an MPM index that corresponds to the index of a particular MPM candidate in an MPM candidate list, with respect to the pertinent chroma block. For example, video decoder 30 may construct the MPM candidate list by first adding one or more DM modes for the chroma block to the MPM candidate list. As described above, video decoder 30 may identify multiple DM modes for the reconstruction of the chroma block. However, it will be appreciated that, in some scenarios, video decoder 30 may identify a single DM mode for the chroma block. After adding the DM mode(s) to the MPM candidate list, video decoder 30 may add other chroma modes from neighboring blocks to the MPM candidate list. Alternatively, or in addition, video decoder 30 may add default modes, such as by using luma MPM candidate list construction processes described in Seregin.

Alternatively, video decoder 30 may construct the chroma MPM candidate list in the same was as for a luma mode MPM candidate list. For instance, video decoder 30 may check several neighboring blocks in an order described in Seregin. In these implementations, video decoder 30 may process the LM mode and/or other chroma-specific intra prediction modes in the same way that video decoder 30 processes other intra prediction modes. Moreover, video decoder 30 may prune the MPM candidate list to remove redundancies arising from identical intra prediction modes being added from multiple sources.

In one example, video encoder 20 may first signal a flag to indicate the usage of one or more chroma-specific modes that are only applied to chroma components, such as the LM mode and/or other prediction modes that are only used for coding of chroma components. If the selected prediction mode is not a chroma-specific mode (i.e., video decoder 30 determines the above-described flag is set to a disabled state), then video decoder 30 may further receive an MPM flag. In this example implementation, when adding chroma prediction modes inherited from a neighboring block to the MPM list, video decoder 30 may not consider chroma-specific modes (e.g., the LM mode), if such a chroma-specific mode is taken from a neighboring block.

An example use case of this implementation is described below. Video decoder 30 may receive an LM flag set to an enabled state, and may therefore reconstruct the chroma block using LM mode intra-prediction. Based on the chroma block having been encoded using the LM prediction mode, video decoder 30 may receive an MPM index that indicates a position within the MPM candidate list for the chroma block. This example use case illustrates that video decoder 30 may use a one-bit flag to first determine whether or not the prediction mode for the chroma block is a candidate in the MPM candidate list at all. If the prediction mode is not a candidate from the MPM candidate list, then video decoder 30 obviates the need for video encoder 20 to signal the index indicating which mode of the MPM candidate list is used to predict the chroma block. In this manner, video decoder 30 may conserve bandwidth by reducing the number of instances in which video encoder 20 is required to signal an index value, which may be more bandwidth-intensive than signaling a one-bit flag.

In some examples, in addition to the LM mode, video encoder 20 and/or video decoder 30 may add other chroma-particular or chroma-specific intra prediction modes to the MPM list, and add the remaining intra prediction modes as the default modes of the list. Alternatively, video encoder 20 may first signal an MPM flag, and when constructing the MPM list, video encoder 20 and/or video decoder 30 may always consider the chroma prediction mode of a neighboring block regardless of whether the neighboring block is predicted using the LM mode or not. In another example, if the LM mode is not added to the MPM list, video encoder 20 and/or video decoder 30 may add the LM mode as the first default mode. In another example, video encoder 20 and/or video decoder 30 may use only the LM and modes from the MPM candidate list, and may remove the default modes altogether. In some examples, video encoder 20 (and optionally, video decoder 30) may add the existing default modes only if the total number of added defaults modes is less than a predetermined integer value denoted by 'K'. In one such example, K is set to a value of four (4).

In some examples, when only one DM is allowed, instead of taking the luma intra prediction mode from the top-left corner with the corresponding luma block, video encoder 20 and/or video decoder 30 may use one or more of the following rules to select the luma intra prediction mode as the DM mode. In one example of such a rule, the luma intra prediction mode is the most frequently used mode within the corresponding luma block. In one example, based on a certain scan order, video encoder 20 and/or video decoder 30 may traverse the intra prediction mode of each unit within the corresponding luma block, and record the number of occurrences of existing luma prediction modes. Video encoder 20 and/or video decoder 30 may select the mode with the greatest number of occurrences. That is, video encoder 20 and/or video decoder 30 may select the luma intra prediction mode that covers most of the size (i.e. area) of the corresponding luma block. When two prediction modes have the same amount of usage in the corresponding luma block, video encoder 20 and/or video decoder 30 may select the prediction mode that is first detected, based the scan order. Here, the unit is defined as the minimum PU/TU size for luma/chroma intra prediction. In some examples, the scan order may be a raster/zig-zag/diagonal/zig-zag scan order or coding order.

Alternatively, video encoder 20 and/or video decoder 30 may start the scan from the center position of the luma block, and traverse to the boundaries in a certain order. Alternatively, or in addition, the scan/unit may be dependent on the PU/TU size. Alternatively, based on a certain scan order, video encoder 20 and/or video decoder 30 may traverse the intra prediction mode of each PU/TU/CU within the corresponding luma block, and record the number of occurrences of existing luma prediction modes are recorded. Video encoder 20 and/or video decoder 30 may select the mode with the greatest number of occurrences. When two modes have the same amount of usage in the luma block, video encoder 20 and/or video decoder 30 may select the prediction mode that appears first (i.e., is first detected) based the scan order. In some examples, the scan order may be the raster/zig-zag/diagonal/zig-zag scan order or coding order. Alternatively, the scan may be dependent on the PU/TU size.

In another alternative, for the examples described above with respect to a single allowed DM mode, if video encoder 20 and/or video decoder 30 determine that two or more modes have an equal number of occurrences in the corresponding luma block, video encoder 20 and/or video decoder 30 may select one of the modes with the equal number of occurrences in the luma block. The selection may depend on the mode index of these multiple luma modes and/or the PU/TU size. Alternatively, for certain block sizes, such as a block size larger than 32×32, video encoder 20 and/or video decoder 30 may evaluate only a portion (e.g., a partial subset) of the luma intra prediction modes of the corresponding luma block according to this single-DM-based rule.

As another example of such a rule with respect to single DM mode scenarios, video encoder 20 and/or video decoder 30 may select the luma intra prediction mode associated with the center position of the corresponding luma block. In one example, video encoder 20 and/or video decoder 30 may define the center position according to the coordinate tuple (2x+W−1, 2y+H−1) for the 4:2:0 color format. Alternatively, video encoder 20 and/or video decoder 30 may define the center position is defined as follows:

- If both W and H are equal to 2, then video encoder 20 and/or video decoder 30 may use position (2x, 2y) as the center position.
- Otherwise, if H is equal to 2, then video encoder 20 and/or video decoder 30 may use position (2x+(2*W/4/2−1)*4, 2y) as the center position.
- Otherwise, if W is equal to 2, then video encoder 20 and/or video decoder 30 may use position (2x, 2y+(2*H/4/2−1)*4) as the center position.
- Otherwise (e.g., both H and W are not equal to 4), then (2x+(2*W/4/2−1)*4, 2y+(2*H/4/2−1)*4) is used as the center position.

According to some examples of the techniques of this disclosure, instead of using same default modes for all blocks, video encoder 20 and/or video decoder 30 may treat the modes derived from the corresponding luma block as the default modes. In one example, the total number of default modes is increased to include more modes that are derived from the corresponding luma block. In another example, the existing default modes are only added when the total number of added defaults modes is less than K (in one non-limiting example, K is set to 4).

FIGS. 12A and 12B illustrate neighboring block selections for adaptive ordering of chroma prediction modes, according to one or more aspects of this disclosure. According to some examples of the techniques of this disclosure, video encoder 20 and/or video decoder 30 may apply adaptive ordering of chroma modes, such that the order may be dependent on chroma modes of neighboring blocks. In one example, video encoder 20 and/or video decoder 30 may apply the adaptive ordering only to certain modes, such as DM and/or LM modes. In another example, the neighboring blocks are the five neighboring blocks, as depicted in FIG. 12A. Alternatively, video encoder 20 and/or video decoder 30 may use only two neighboring blocks, e.g., A1 and B1 as shown in FIG. 12A, or above (A) and left (L) blocks shown in FIG. 12B. In one example, video encoder 20 and/or video decoder 30 may put the LM mode before DM mode(s) when all available neighboring intra coded blocks are coded with the LM mode. Alternatively, video encoder 20 and/or video decoder 30 may put the LM mode before the DM mode(s) when at least one of available neighboring intra coded blocks are coded with LM mode.

According to some examples of this disclosure, video encoder 20 and/or video decoder 30 may use the luma information to re-order chroma syntax values before entropy coding. In one example, the luma block's NSST index may be used to update the coding order of chroma NSST index. In this case, video encoder 20 and/or video decoder 30 may first encode/decode a bin that indicates whether the chroma block's index is the same as the corresponding luma block's NSST index. In another example, video encoder 20 and/or video decoder 30 may use the luma block's adaptive multiple transform (AMT) index to update the coding order of the chroma AMT index. In this case, video encoder 20 and/or video decoder 30 may first encode/decode a bin to indicate whether the chroma block's index is the same as the corresponding luma block's AMT index. Video encoder 20 and/or video decoder 30 may use another (e.g., similar) way for any other syntax, for which the method is applicable to both luma and chroma components, while the index/mode can be different for luma and chroma components.

According to some examples of this disclosure, video encoder 20 and/or video decoder 30 may derive multiple sets of LM parameters for one chroma block, such that the derivation is based on luma intra prediction modes of the corresponding luma block. In one example, video encoder 20 and/or video decoder 30 may derive up to K sets of parameters, e.g., where 'K' represents an integer value. In one example, 'K' is set to a value of two (2). In another example, video encoder 20 and/or video decoder 30 may classify neighboring luma/chroma samples into K sets based on the intra prediction modes of samples located in the corresponding luma block. Video encoder 20 and/or video decoder 30 may classify the luma sample samples within the corresponding luma block into K sets based on the intra prediction modes of samples located in the corresponding luma block. In another example, when two intra prediction modes are considered to be "far away," e.g., if the absolute value of mode index is larger than a threshold, video encoder 20 and/or video decoder 30 may treat the corresponding sub-blocks and neighboring samples as using different parameters.

According to some examples of this disclosure, video encoder 20 and/or video decoder 30 may use a compound DM mode for encoding/decoding the current chroma block.

According to the compound DM mode of this disclosure, video encoder 20 may generate the prediction block using a weighted sum of the prediction blocks generated from two or more identified intra prediction modes. Video encoder 20 may identify two or more intra prediction modes, which are used for encoding the co-located luma blocks, or used for encoding the neighboring chroma blocks, or used for encoding the neighboring of corresponding luma blocks. Then, video encoder may generate the prediction blocks of each of the identified intra prediction modes, and may derive a weighted sum of the two or more generated prediction blocks as the prediction block of this compound DM mode.

In one example, the weights for generating the prediction block of this compound DM mode depend on the area size of each identified intra prediction mode applied on the corresponding luma block. Alternatively, the weight of the prediction block for each identified intra prediction mode may depend on the position of the current pixel and whether the current identified Intra prediction mode is covering the current pixel. In another alternative, the weights are identical for each identified intra prediction mode. In another alternative still, video encoder 20 and/or video decoder 30 may utilize a set of pre-defined weights. In yet another alternative, or in addition, video encoder 20 may signal an index of weights for each CTU/CU/PU/TU. When signaling the default modes (non-DM and non-LM modes as shown in Table 7.1), if the default modes have been identified for generating the compound DM mode, then video encoder 20 may replace the default modes with other intra prediction modes that are not identified for generating the compound DM mode.

FIGS. 13A and 13B are conceptual diagrams illustrating examples of block positions that video encoder 20 and video decoder 30 may use to select chroma intra prediction modes according to the multiple DM mode selection-based techniques described above. One example implementation with respect to multiple DM mode-based selection for chroma coding is described below. As described above, in accordance with aspects of this disclosure, video encoder 20 (and optionally, video decoder 30) may perform selection of DM modes. That is, in some examples, video encoder 20 may explicitly signal a DM candidate list, thereby eliminating the need for video decoder 30 to also form a DM candidate list. In other examples, video encoder 20 may signal just the index of a selected candidate from the DM candidate list, enabling video decoder 30 to select a candidate from a DM candidate list that video decoder 30 also forms.

FIG. 13A illustrates prediction modes used in sub-blocks of a luma component (luma block 202). FIG. 13B illustrates luma mode inheritance with respect to chroma block 204, in accordance with HEVC techniques. As shown, the prediction mode from the top-left sub-block of luma block 202 (namely, mode L(1)) is inherited with respect to the left region of chroma block 204, in accordance with HEVC techniques. As shown in FIG. 13A, the luma modes that are used for sub-blocks located at the center (C0), top-left (TL), top-right (TR), bottom-left (BL) and bottom-right (BR) are obtained (e.g., by video encoder 20 and optionally, video decoder 30). The modes are denoted by the initialisms DMC, DMTL, DMTR, DMBL, DMBR. In some alternatives, video encoder 20 (and optionally, video decoder 30) may replace the C0 selection with a selection of a mode used at positions C1 and/or C2 and/or C3. In addition, video encoder 20 (and optionally, video decoder 30) may add, to the DM candidate list, the luma mode that covers the most area of luma block 202 as an additional DM mode. The luma mode that covers the greatest area of luma block 202 is denote by the initialism "DMM."

Video encoder 20 (and optionally, video decoder 30) may construct the DM candidate list using one or more techniques discussed below. A number of candidates (denoted by 'N') from the group of candidates including DMC, DMTL, DMTR, DMBL, and DMBL may be added to the DM candidate list, according to a predetermined order. In one example, 'N' is set to six (6) and the order may be as follows: DMC, DMM, DMTL, DMTR, DMBL, DMBR. In one alternative, 'N' is set to five (5), and the order may be as follows: DMC, DMTL, DMTR, DMBL, DMBR. In forming the candidate list, video encoder 20 (and optionally, video decoder 30) may prune each candidate against all candidates or a partial subset (e.g., a true subset) of previously-added candidates, before adding each such candidate to the DM candidate list. While two example orders are discussed above, it will be appreciated that video encoder 20 (and optionally, video decoder 30) may use various other orders as well, in accordance with aspects of this disclosure. Supposing the total number of DM modes in the candidate list is 'M' (where 'M' is a positive integer), the total number of default modes is denoted by 'F', then a particular candidate of the DM candidate list is denoted by $DM_i$. In this notation, the subscript 'i' represents an integer value ranging from 0 to M−1).

Video encoder 20 (and optionally, video decoder 30) may use apply pruning among the DM candidates and default modes. That is, in forming the DM candidate list, video encoder 20 (and optionally, video decoder 30) may prune the DM candidates against the default modes. In one alternative, for each $DM_i$, video encoder 20 (and optionally, video decoder 30) may compare the $DM_i$ with each of the default modes. If any default mode(s) are found to be identical to the $DM_i$, then video encoder 20 (and optionally, video decoder 30) may replace the first such default mode (which is found to be identical to the $DM_i$) with an alternative mode. For instance, video encoder 20 (and optionally, video decoder 30) may replace a pruned default mode with a mode that has an index value equal to (K−1−i) where 'K' is the total number of luma prediction modes for the corresponding luma block. Example pseudo-code for these operations is given below:

```
for ( i = 0; i < M; i++)
{
    DMIdx = DM_i;
    for ( j = 0; j < F; j ++) //suppose 4 default modes
    {
        if( DMIdx == j-th default mode)
        {
            j-th default mode = Mode (K-1-i)
        }
    }
}
```

For example, the default modes may be: mode 0 (Planar) mode 50 (Vertical direction), mode 18 (Horizontal direction) and mode 1 (DC), and DM candidate list is {mode 0, mode 63, mode 50, mode 1}. After the pruning process, the default modes are replaced by the following set: {mode 66, mode 64, mode 18, mode 63}. In another alternative, video encoder 20 (and optionally, video decoder 30) may apply full pruning, where each default mode is pruned against all DM modes. That is, for each default mode, the default mode is compared with all DM modes. If the step-by-step comparison indicates that one of the DM modes is identical to the default mode currently being examined, then the default mode is replaced by the last non-DM mode. Example pseudo-code for this example is given below:

```
Bool ModeAdded [K];
memset ( ModeAdded, false, K*sizeof(Bool)); //initialized to be false
for ( i = 0; i < M; i++)
{
   ModeAdded [DMi] = true; //set the flag to be true when the corresponding intra mode
is added as DM
}
Set variable LastAvailModeIdx = K-1;
for ( i = 0; i < F; i ++)                              //loop each default mode
{
   if( ModeAdded [i-th default mode] == true) //has been added to the chroma mode
                                              //list
   {
       for( j= LastAvailModeIdx; j >=0; j--)
       {
          if( ModeAdded [j] == true) //hasn't been added to the chroma mode list
          {
             i-th default mode = mode j; //default mode is replaced by the last
                                         // available mode
             LastAvailModeIdx = j - 1; //update the variable to record the last
                                       // index that may be not added
             break;
          }
       }
   }
}
```

Video encoder 20 may implement various aspects of the multiple DM mode-based techniques of this disclosure to implement signaling of chroma modes. Video encoder 20 may encode the chroma modes according to a process that includes the following portions. As one part, video encoder 20 may encode and signal a one-bit flag to indicate the usage of any of the prediction modes that are only applicable to chroma components (e.g., LM, which is particular to chroma encoding). If the chroma block is encoded according to such a chroma-specific mode (thereby causing video encoder 20 to set the flag to an enabled state), video encoder 20 may additionally encode and signal index for the particular mode.

Additionally, video encoder 20 may encode and signal a flag to indicate the usage of modes that are derived from the corresponding luma block. That is, if video encoder 20 selected a prediction mode for encoding the chroma block based on the prediction mode(s) used for the corresponding luma block, then video encoder 20 may set the flag to an enabled state. In turn, if the chroma block is encoded using a prediction mode inherited from the corresponding luma block, video encoder 20 may additionally encode and signal index for the mode selected from the corresponding luma block.

If video encoder 20 determines that the chroma block is encoded according to neither a chroma-specific prediction mode nor a luma block-derived prediction mode, video encoder 20 may encode and signal information identifying the remaining modes. Video encoder 20 may implement the above-listed parts/options of chroma encoding according to different orders. Examples of different orders are given in the following table 7.3 and table 7.4 or Table 8.

TABLE 7.3

Specification of Chroma Intra Prediction Modes and Associated Names

|  | Chroma Intra prediction mode | Primary mode | Chroma intra alternative mode if needed |
|---|---|---|---|
| Default modes | 0 | INTRA_PLANAR | INTRA_ANGULAR66/ |
|  | 1 | INTRA_ANGULAR26 | INTRA_ANGULAR65/ |
|  | 2 | INTRA_ANGULAR10 | INTRA_ANGULAR64/ |

TABLE 7.3-continued

Specification of Chroma Intra Prediction Modes and Associated Names

|  | Chroma Intra prediction mode | Primary mode | Chroma intra alternative mode if needed |
|---|---|---|---|
|  | 3 | INTRA_DC | INTRA_ANGULAR63 |
|  | 4 | LM | N/A |
| DM modes | 5 | Derived mode $DM_0$ | N/A |
|  | 6 | Derived mode $DM_1$ | N/A |
|  | ... | ... | N/A |
|  | 4 + M | Derived mode $DM_{M-1}$ | N/A |

TABLE 7.4

Bin string for each chroma mode

| Chroma Intra prediction mode | Bin string | Note |
|---|---|---|
| 0 | *1 1* 00 | For the first two bins (shown in italics), each bin is coded with one context model. |
| 1 | *1 1* 01 |  |
| 2 | *1 1* 10 |  |
| 3 | *1 1* 11 |  |
| 4 | *1* 0 |  |
| 5 | *0* 0 | Truncated unary is used to code the DM index (bold italics) |
| 6 | *0* 1 0 |  |
| ... | *0* 1 0 |  |
| 3 + M | *0* 1 1..1 0 |  |
| 4 + M | *0* 1 1..1 1 |  |

TABLE 8

Bin string for each chroma mode

| Chroma Intra prediction mode | Bin string | Note |
|---|---|---|
| 0 | *1 1* 00 | For the first two bins (shown in italics), each bin is coded with one context model. |
| 1 | *1 1* 01 | |
| 2 | *1 1* 10 | |
| 3 | *1 1* 11 | |
| 4 | *1* 0 | |
| 5 | *0* 0 | Truncated unary is used to code the DM index (bold italicized digits) |
| 6 | *0* 10 | |
| ... | *0* 10 | |
| 3 + M | *0* 11..1 0 | |
| 4 + M | *0* 11..1 1 | |

As described above, aspects of this disclosure are directed to the unification of luma and chroma modes. An example implementation of the unification of luma and chroma mode is described below. The total allowed number of most probable mode (MPM) candidates is denoted below by $N_{mpm}$. Video encoder 20 and/or video decoder 30 may construct the mode list of chroma intra modes to include the following parts:

LM mode; and
MPM modes.

The MPM mode portion may include a DM candidate list and a chroma modes portion. Video encoder 20 (and optionally, video decoder 30) may form the DM candidate list portion of the unified candidate list using the same techniques as described above with the DM ca multiple DM modes. With respect to the chroma modes portion of the MPM modes, video encoder 20 (and optionally, video decoder 30) may derive the chroma modes from neighboring blocks of the currently-coded chroma block. For instance, to derive the chroma modes from the neighboring blocks, video encoder 20 (and optionally, video decoder 30) may reuse the MPM construction process that is used for luma modes. If the total number of MPM candidates is still smaller than $N_{mpm}$ after performing the list construction processes described above, video encoder 20 (and optionally, video decoder 30) may implement various steps, as per JVET-C0055 cited above.

For instance, if the total number of MPM candidates is lesser than the value of $N_{mpm}$ after performing the list constructions processes set forth above, video encoder 20 (and optionally, video decoder 30) may add the following modes: left (L), above (A), Planar, DC, below left (BL), above right (AR), and above left (AL) modes. If the MPM candidate list is still not complete (i.e. if the total number of MPM candidates is lesser than the value of $N_{mpm}$), video encoder 20 (and optionally, video decoder 30) may add −1 and +1 to the already-included angular modes. If MPM list is still not complete, the MPM candidate list is still not complete (i.e. if the total number of MPM candidates is lesser than the value of $N_{mpm}$), video encoder 20 (and optionally, video decoder 30) may add default modes, namely, the vertical, horizontal, 2, and diagonal modes.

Non-MPM modes that video encoder 20 and/or video decoder 30 may identify include any remaining intra prediction modes that are not included in the MPM candidate list construction processes described above. A difference from the luma-based MPM list construction process described above (e.g., at portions referencing JVET-C0055) is that, when one candidate is added, the added candidate is not an LM mode. Alternatively or in addition, planar and DC modes may be added after all spatial neighbors. Alternatively, video encoder 20 and/or video decoder 30 may implement one or more other MPM list construction techniques to replace the techniques of JVET-C0055.

With respect to the unification of luma and chroma modes, video encoder 20 may implement various chroma mode signaling techniques of this disclosure. Video encoder 20 may encode the chroma modes according to a process that includes the following portions. As one part, video encoder 20 may encode and signal a one-bit flag to indicate the usage of any of the prediction modes that are only applicable to chroma components (e.g., the LM mode, which is particular to chroma encoding). If the chroma block is encoded according to such a chroma-specific mode (thereby causing video encoder 20 to set the flag to an enabled state), video encoder 20 may additionally encode and signal index for the particular mode.

Additionally, video encoder 20 may encode and signal a flag to indicate the usage of modes that are included in the MPM candidate list. That is, if video encoder 20 selected a prediction mode for encoding the chroma block, and the selected prediction mode is included in the MPM candidate list, then video encoder 20 may set the flag to an enabled state. In turn, if the chroma block is encoded using a prediction mode included in the MPM candidate list, video encoder 20 may additionally encode and signal an index for the mode, indicating the position of the mode in the MPM candidate list.

If video encoder 20 determines that the chroma block is encoded according to neither a chroma-specific prediction mode nor a prediction mode included in the MPM candidate list, video encoder 20 may encode and signal information identifying the remaining modes. Video encoder 20 may implement the above-listed parts/options of chroma encoding according to different orders. Examples of different orders are given in the following Table 8.1 or Table 9.

TABLE 8.1

Bin string for each chroma mode

| Chroma Intra prediction mode | Primary mode | Bin string | Note |
|---|---|---|---|
| 0 | LM | 0 | Truncated unary is used to code the MPM index (bold italics) |
| 1 | $MPM_0$ | 1 0 *0* | |
| 2 | $MPM_1$ | 1 0 *1*0 | |
| ... | ... | 1 0 *1..1* 0 | |
| $N_{mpm}$ | $MPM_{(Nmpm-1)}$ | 1 0 *1..1 1* | |
| 5 | Non-$MPM_0$ | May be coded in a way similar to luma non-mpm coding | |
| 6 | Non-$MPM_1$ | | |
| ... | ... | | |
| K − 1 | Non-$MPM_{K-1-Nmpm}$ | | |

If the mode list of chroma intra modes includes just the LM and MPM parts (including multiple DM modes and modes from spatial neighbors as luma MPM does), then video encoder 20 may implement the signaling of chroma modes in a further modified manner, as shown in Table 9 below:

TABLE 9

| Chroma Intra prediction mode | Primary mode | Bin string | Note |
|---|---|---|---|
| 0 | LM | 0 | Truncated unary is used to code the MPM index (bold italics) |
| 1 | $MPM_0$ | 1 *0* | |

TABLE 9-continued

| Chroma Intra prediction mode | Primary mode | Bin string | Note |
|---|---|---|---|
| 2 | $MPM_1$ | 1 *11* | |
| ... | ... | 1 *1..1 0* | |
| $N_{mpm}$ | $MPM_{(Nmpm\ -1)}$ | 1*1..1 1* | |

In another alternative, video encoder 20 (and optionally, video decoder 30) may always add default modes (such as Planar, DC, Horizontal, vertical modes) to the MPM candidate list. In one example, the $N_{mpm}$ candidates of the MPM candidate list may first be constructed with one or more of the above-described techniques. Then, the missing modes of default modes may replace the last one or more MPM candidates.

Figure 14:
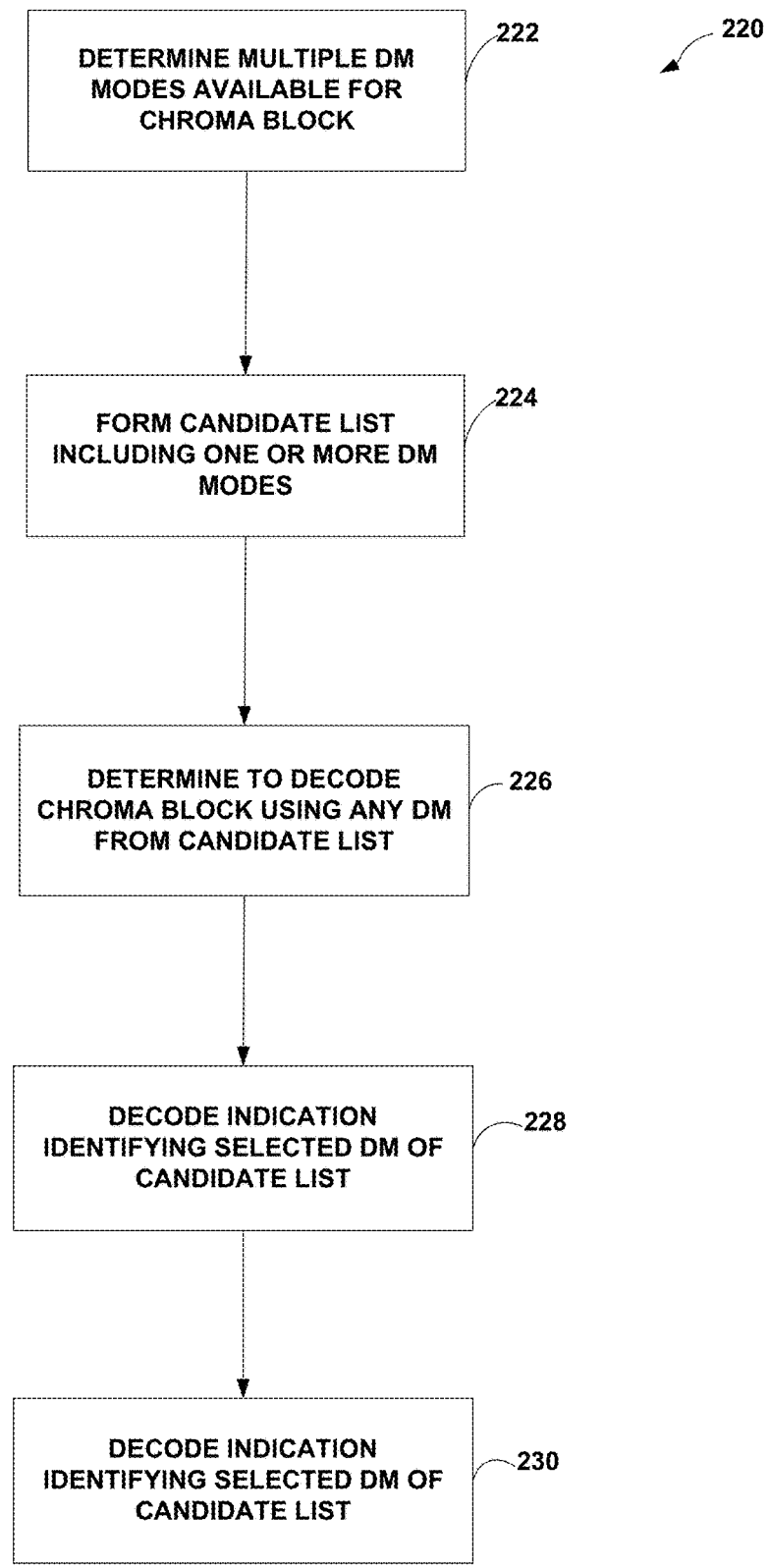
FIG. 14 is a flowchart illustrating an example process that processing circuitry of a video decoding device may perform, in accordance with aspects of this disclosure.

FIG. 14 is a flowchart illustrating an example process 220 that processing circuitry of video decoder 30 may perform, in accordance with aspects of this disclosure. Process 220 may begin when the processing circuitry of video decoder 30 determines that multiple derived modes (DMs) available for predicting a luma block of video data are also available for predicting a chroma block of the video data, the chroma block corresponding to the luma block (222). Video decoder 30 may form a candidate list of prediction modes with respect to the chroma block, the candidate list including one or more DMs of the multiple DMs that are available for predicting the chroma block (224). In some non-limiting examples, the processing circuitry of video decoder 30 may receive, in an encoded video bitstream, data indicating each respective DM of the one or more DMs of the candidate list, and reconstruct the received data indicating each respective DM of the one or more DMs to form the candidate list. In other examples, the processing circuitry of video decoder 30 may construct the candidate list.

The processing circuitry of video decoder 30 may determine to decode the chroma block using any DM of the one or more DMs of the candidate list (226). In some non-limiting examples, the processing circuitry of video decoder 30 may receive, in the encoded video bitstream, a one-bit flag indicating that the chroma block is encoded using one of the DMs. Based on the determination to decode the chroma block using any DM of the one or more DMs of the candidate list, the processing circuitry of video decoder 30 may decode an indication identifying a selected DM of the candidate list to be used for decoding the chroma block (228). For instance, the processing circuitry of video decoder 30 may reconstruct data (received in the encoded video bitstream) that indicates an index value that identifies the position of the selected DM in the candidate list. In turn, the processing circuitry of video decoder 30 may decode the chroma block according to the selected DM (230). In various examples, the video data including the luma and chroma blocks may be stored to a memory of video decoder 30.

In some examples, the one or more DMs included in the candidate list may include one or more of a first prediction mode associated with a center position of the corresponding luma block, a second prediction mode associated with a top-left position of the corresponding luma block, a third prediction mode associated with a top-right position of the corresponding luma block, a fourth prediction mode associated with a below-left position of the corresponding luma block, or a fifth prediction mode associated with a below-right position of the corresponding luma block. In some examples, the candidate list may further include one or more chroma intra prediction modes that are different from each of the one or more DMs. In some such examples, each of the chroma intra prediction modes corresponds to a mode used to predict a neighboring chroma block of the chroma block. In some examples, at least one respective chroma intra prediction mode of the candidate list is a chroma-specific prediction mode that is used only for predicting chrominance data.

Figure 15:
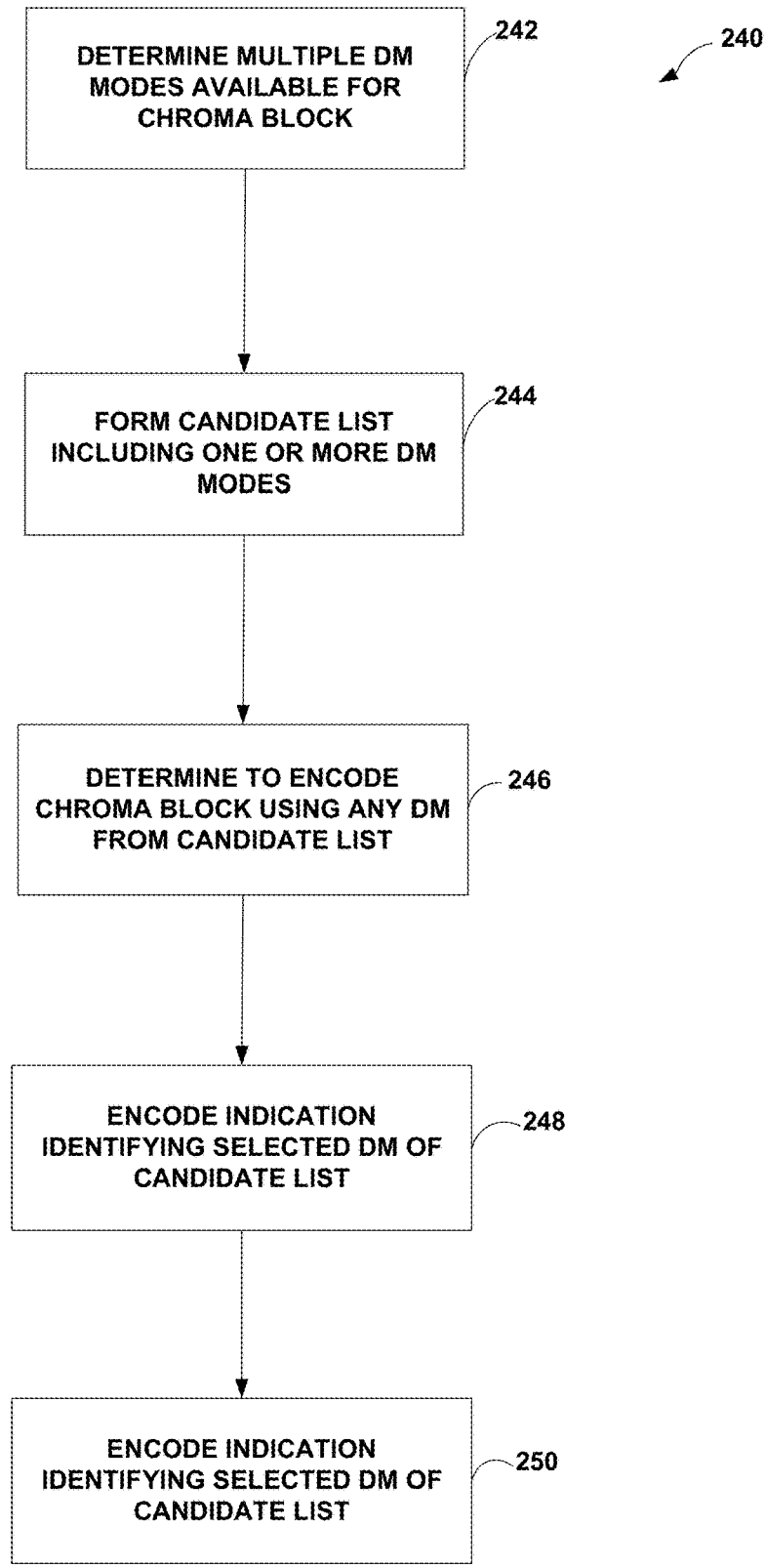
FIG. 15 is a flowchart illustrating an example process that processing circuitry of a video encoding device may perform, in accordance with aspects of this disclosure.

FIG. 15 is a flowchart illustrating an example process 240 that processing circuitry of video encoder 20 may perform, in accordance with aspects of this disclosure. Process 240 may begin when the processing circuitry of video encoder 20 determines that multiple derived modes (DMs) available for predicting a luma block of video data are also available for predicting a chroma block of the video data, the chroma block corresponding to the luma block (242). In various examples, the video data including the luma and chroma blocks may be stored to a memory of video encoder 20. Video encoder 20 may form a candidate list of prediction modes with respect to the chroma block, the candidate list including one or more DMs of the multiple DMs that are available for predicting the chroma block (244).

The processing circuitry of video encoder 20 may determine to encode the chroma block using any DM of the one or more DMs of the candidate list (246). Based on the determination to encode the chroma block using any DM of the one or more DMs of the candidate list, the processing circuitry of video encoder 20 may encode an indication identifying a selected DM of the candidate list to be used for decoding the chroma block (248). For instance, the processing circuitry of video encoder 20 may encode data that indicates an index value that identifies the position of the selected DM in the candidate list, and signal the encoded data in an encoded video bitstream. In turn, the processing circuitry of video encoder 20 may encode the chroma block according to the selected DM (250). In some examples, the processing circuitry of video encoder 20 may signal, in the encoded video bitstream, a one-bit flag indicating whether the chroma block is encoded using a linear model (LM) mode. In these examples, the processing circuitry of video encoder 20 may signal, in the encoded video bitstream, data indicating each respective DM of the one or more DMs of the candidate list.

In some examples, the one or more DMs included in the candidate list may include one or more of a first prediction mode associated with a center position of the corresponding luma block, a second prediction mode associated with a top-left position of the corresponding luma block, a third prediction mode associated with a top-right position of the corresponding luma block, a fourth prediction mode associated with a below-left position of the corresponding luma block, or a fifth prediction mode associated with a below-right position of the corresponding luma block. In some examples, the candidate list may further include one or more chroma intra prediction modes that are different from each of the one or more DMs. In some such examples, each of the chroma intra prediction modes corresponds to a mode used to predict a neighboring chroma block of the chroma block. In some examples, at least one respective chroma intra prediction mode of the candidate list is a chroma-specific prediction mode that is used only for predicting chrominance data. In some examples, the processing circuitry of video encoder 20 may determine that at least two DMs of the one or more DMs are identical, and may include exactly one DM of the at least two identical DMs in the candidate list.

Figure 16:
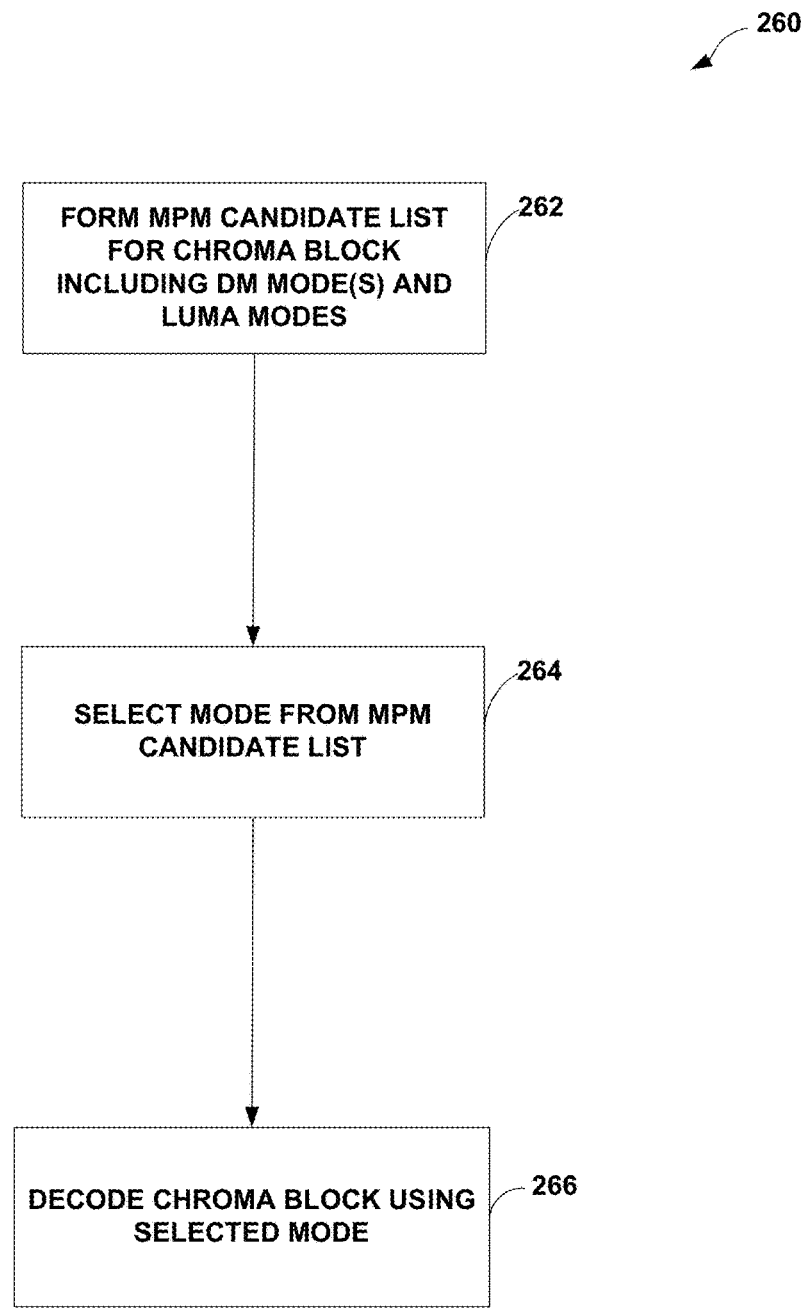
FIG. 16 is a flowchart illustrating an example process that processing circuitry of a video decoding device may perform, in accordance with aspects of this disclosure.

FIG. 16 is a flowchart illustrating an example process 260 that processing circuitry of video decoder 30 may perform, in accordance with aspects of this disclosure. Process 260 may begin when the processing circuitry of video decoder 30 forms a most probable mode (MPM) candidate list for a chroma block of video data stored to a memory of video decoder 30, such that the MPM candidate list includes one or more derived modes (DMs) associated with a luma block of the video data associated with the chroma block, and multiple luma prediction modes that can be used for decoding luminance components of the video data (262). In some examples, the processing circuitry of video decoder 30 may add the one or more DMs to the MPM candidate list, and may add one or more chroma modes inherited from neighboring chroma blocks of the chroma block at positions of the MPM candidate list that occur after positions of all of the one or DMs in the MPM candidate list.

In some examples, the processing circuitry of video decoder 30 may omit any additional instance of the LM mode from the MPM candidate list in response to a determination that the LM mode was used to predict one or more neighboring chroma blocks of the chroma block. In some examples, the processing circuitry of video decoder 30 may receive, in an encoded video bitstream, a one-bit flag indicating whether the chroma block is encoded using the LM mode. In one scenario, the processing circuitry of video decoder 30 may determine that the received one-bit flag is set to a disabled state, may receive an MPM index corresponding to a particular mode of the MPM candidate list, and based on the received one-bit flag being set to the disabled state, may select the particular mode corresponding to the received MPM index. In another scenario, the processing circuitry of video decoder 30 may determine that the received one-bit flag is set to an enabled state, and based on the received one-bit flag being set to the enabled state, may select the LM mode from the MPM candidate list.

In some examples, the processing circuitry of video decoder 30 may determine whether a number of default modes associated with the chroma block meets a predetermined threshold. Based on a determination that the number of default modes meets the predetermined threshold, the processing circuitry of video decoder 30 may add each default mode of the default modes to the MPM candidate list, and may omit all of the default modes from the MPM candidate list. The processing circuitry of video decoder 30 may select a mode from the MPM candidate list (264). In turn, the processing circuitry of video decoder 30 may decode the chroma block according to the mode selected from the MPM candidate list (266).

In some examples, to form the MPM candidate list, the processing circuitry of video decoder 30 may add the one or more DMs to the MPM candidate list, and may add one or more chroma modes inherited from neighboring chroma blocks of the chroma block at positions of the MPM candidate list that occur after positions of all of the one or DMs in the MPM candidate list. In some examples, to form the MPM candidate list, the processing circuitry of video decoder 30 may add one or more linear model (LM) modes to the MPM candidate list. In one such example, the processing circuitry of video decoder 30 may determine that the one or more LM modes comprise a first instance of a first LM mode and one or more additional instances of the first LM mode, and may omit the one or more additional instances of the LM mode from the MPM candidate list in response to a determination that the first LM mode was used to predict one or more neighboring chroma blocks of the chroma block.

In some examples, the processing circuitry of video decoder 30 may receive, in the encoded video bitstream, a one-bit flag indicating whether the chroma block is encoded using the LM mode, wherein selecting the mode from the MPM candidate list is based on a value of the one-bit flag. In some such examples, the processing circuitry of video decoder 30 may determine that the one or more LM modes include multiple LM modes, and may determine that the received one-bit flag is set to an enabled state. In some such examples, the processing circuitry of video decoder 30 may receive an LM index corresponding to a position of a particular LM mode of the multiple LM modes in the MPM candidate list and may, based on the received one-bit flag being set to the enabled state, select the particular LM mode corresponding to the received LM index for coding the chroma block. In some examples, to select the mode from the MPM candidate list, the processing circuitry of video decoder 30 may determine that the received one-bit flag is set to a disabled state, may receive an MPM index corresponding to a particular mode of the MPM candidate list, and may, based on the received one-bit flag being set to the disabled state, select the particular mode corresponding to the received MPM index.

In some examples, the processing circuitry of video decoder 30 may determine whether a number of default modes associated with the chroma block meets a predetermined threshold. In these examples, the processing circuitry of video decoder 30 may perform one of (i) adding, based on a determination that the number of default modes does not meet the predetermined threshold, adding each default mode of the default modes to the MPM candidate list; or (ii) omitting, based on a determination that the number of default modes meets the predetermined threshold, all of the default modes from the MPM candidate list.

Figure 17:
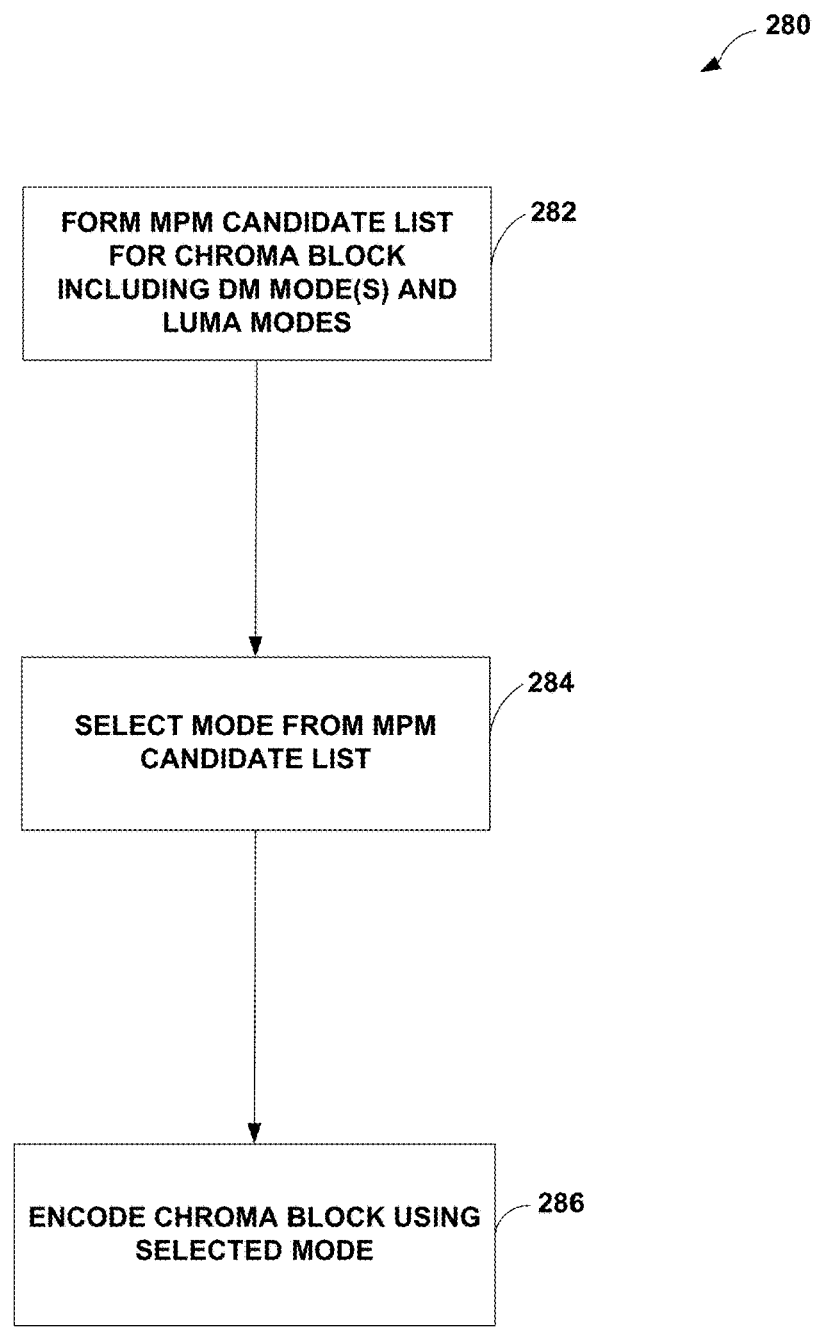
FIG. 17 is a flowchart illustrating an example process that processing circuitry of a video encoding device may perform, in accordance with aspects of this disclosure.

FIG. 17 is a flowchart illustrating an example process 280 that processing circuitry of video encoder 20 may perform, in accordance with aspects of this disclosure. Process 280 may begin when the processing circuitry of video encoder 20 forms a most probable mode (MPM) candidate list for a chroma block of video data stored to a memory of video encoder 20, such that the MPM candidate list includes a linear model (LM) mode, one or more derived modes (DMs) associated with a luma block of the video data associated with the chroma block, and multiple luma prediction modes that can be used for decoding the luma block (282). In some examples, the processing circuitry of video encoder 20 may add the one or more DMs to the MPM candidate list, and may add one or more chroma modes inherited from neighboring chroma blocks of the chroma block at positions of the MPM candidate list that occur after positions of all of the one or DMs in the MPM candidate list.

In some examples, the processing circuitry of video encoder 20 may omit any additional instance of the LM mode from the MPM candidate list in response to a determination that the LM mode was used to predict one or more neighboring chroma blocks of the chroma block. In some examples, the processing circuitry of video encoder 20 may signal, in an encoded video bitstream, a one-bit flag indicating whether the chroma block is encoded using the LM mode. In one scenario, the processing circuitry of video encoder 20 may, based on a determination that the chroma block is not encoded using the LM mode, set the one-bit flag to a disabled state. In this scenario, based on the determination that the chroma block is not encoded using the LM mode and on a determination that the chroma block is encoded using a particular mode of the MPM candidate list, the processing circuitry of video encoder 20 may signal, in the encoded video bitstream, an MPM index corresponding to the particular mode of the MPM candidate list. In another scenario, the processing circuitry of video encoder 20 may, based on a determination that the chroma block is encoded using the LM mode, set the one-bit flag to an enabled state.

In some examples, the processing circuitry of video encoder 20 may determine whether a number of default modes associated with the chroma block meets a predetermined threshold. Based on a determination that the number of default modes meets the predetermined threshold, the processing circuitry of video encoder 20 may add each default mode of the default modes to the MPM candidate list, and may omit all of the default modes from the MPM candidate list. The processing circuitry of video encoder 20 may select a mode from the MPM candidate list (284). In turn, the processing circuitry of video encoder 20 may encode the chroma block according to the mode selected from the MPM candidate list.

In some examples, to form the MPM candidate list, the processing circuitry of video encoder 20 may add one or more linear model (LM) modes to the MPM candidate list. In some examples, the processing circuitry of video encoder 20 may signal, in an encoded video bitstream, a one-bit flag indicating whether the chroma block is encoded using any of the one or more LM modes of the MPM candidate list. In some examples, the processing circuitry of video encoder 20 may set, based on a determination that the chroma block is not encoded using any LM mode of the candidate list, set the one-bit flag to a disabled state, and may signal, based on the determination that the chroma block is not encoded using any LM mode of the MPM candidate list and based on a determination that the chroma block is encoded using a particular mode of the MPM candidate list, in the encoded video bitstream, an MPM index corresponding to the particular mode of the MPM candidate list. In some examples, the processing circuitry of video encoder 20 may set, based on a determination that the chroma block is encoded using a particular LM mode of the one or more LM modes of the MPM candidate list, the one-bit flag to an enabled state.

In some examples, the processing circuitry of video encoder 20 may determine whether a number of default modes associated with the chroma block meets a predetermined threshold. In turn, the processing circuitry of video encoder 20 may perform one of: (i) add, based on a determination that the number of default modes does not meet the predetermined threshold, each default mode of the default modes to the MPM candidate list; or (ii) omit, based on a determination that the number of default modes meets the predetermined threshold, omitting all of the default modes from the MPM candidate list.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining that multiple derived modes (DMs) available for predicting a luma block of the video data are also available for predicting a chroma block of the video data that corresponds to the luma block;
    obtaining, from an encoded video bitstream, a one-bit flag indicating that the chroma block is encoded using any DM included in a candidate list;
    forming the candidate list of prediction modes with respect to the chroma block, the candidate list including a plurality of DMs selected from the multiple DMs that are available for predicting the chroma block, the plurality of the DMs included in the candidate list including two or more of a first prediction mode associated with a center position of the corresponding luma block, a second prediction mode associated with a top-left position of the corresponding luma block, a third prediction mode associated with a top-right position of the corresponding luma block, a fourth prediction mode associated with a below-left position of the corresponding luma block, or a fifth prediction mode associated with a below-right position of the corresponding luma block;
    based on a value of the one-bit flag obtained from the encoded video bitstream, determining to reconstruct the chroma block using any DM of the plurality of the DMs included in the candidate list;
    based on the determination to code the chroma block using any DM of the plurality of the DMs included in the candidate list, reconstructing an indication identifying a selected DM of the candidate list to be used for reconstructing the chroma block; and
    reconstructing the chroma block according to the selected DM of the candidate list.

2. The method of claim 1, further comprising: obtaining, from the
    encoded video bitstream, a one-bit flag indicating whether the chroma block is encoded using a linear model (LM) mode; and
    obtaining, from the encoded video bitstream, data identifying each respective DM of the plurality of the DMs included in the candidate list.

3. The method of claim 1, further comprising:
    determining that at least two DMs of the plurality of the DMs included in the candidate list are identical; and
    including exactly one DM of the at least two identical DMs in the candidate list.

4. The method of claim 1, wherein the candidate list further includes one or more chroma intra prediction modes that are different from each of the plurality of the DMs included in the candidate list.

5. The method of claim 4, wherein each of the chroma intra prediction modes corresponds to a mode used to predict a neighboring chroma block of the chroma block.

6. The method of claim 4, wherein at least one respective chroma intra prediction mode of the candidate list is a chroma-specific prediction mode that is used only for predicting chrominance data.

7. A device comprising:
    a memory configured to store an encoded video bitstream; and
    processing circuitry in communication with the memory, the processing circuitry being configured to:
        determine that multiple derived modes (DMs) available for predicting a luma block of the encoded video bitstream stored to the memory are also available for predicting a chroma block of the encoded video bitstream stored to the memory, the chroma block corresponding to the luma block;
        obtain, from the encoded video bitstream stored to the memory, a one-bit flag indicating that the chroma block is encoded using any DM included in a candidate list;
        form the candidate list of prediction modes with respect to the chroma block, the candidate list including a plurality of DMs selected from the multiple DMs that are available for predicting the chroma block, the plurality of the DMs included in the candidate list including two or more of a first prediction mode associated with a center position of the corresponding luma block, a second prediction mode associated with a top-left position of the corresponding luma block, a third prediction mode associated with a top-right position of the corresponding luma block, a fourth prediction mode associated with a below-left position of the corresponding luma block, or a fifth prediction mode associated with a below-right position of the corresponding luma block;
        determine, based on a value of the one-bit flag obtained from the encoded video bitstream, to reconstruct the chroma block using any DM of the plurality of the DMs included in the candidate list;
        based on the determination to code the chroma block using any DM of the plurality of the DMs included in the candidate list, reconstruct, from the
    encoded video bitstream stored to the memory, an indication identifying a selected DM of the candidate list to be used to reconstruct the chroma block; and reconstruct the chroma block according to the selected DM of the candidate list.

8. The device of claim 7, wherein the processing circuitry is further configured to:
    obtain, from the encoded video bitstream, a one-bit flag indicating whether the chroma block is encoded using a linear model (LM) mode; and
    obtain, from the encoded video bitstream, data indicating each respective DM of the plurality of the DMs included in the candidate list.

9. The device of claim 7, wherein the one or more processors are further configured to:
    determine that at least two DMs of the plurality of the DMs included in the candidate list are identical; and
    include exactly one DM of the at least two identical DMs in the candidate list.

10. The device of claim 7, wherein the candidate list further includes one or more chroma intra prediction modes that are different from each of the plurality of the DMs included in the candidate list.

11. The device of claim 10, wherein each of the chroma intra prediction modes is associated with coding of a respective neighboring chroma block of the chroma block.

12. The device of claim 10, wherein at least one respective chroma intra prediction mode of the candidate list is a chroma-specific prediction mode that is used only for predicting chrominance data.

13. A method of encoding video data, the method comprising:
    determining that multiple derived modes (DMs) available for predicting a luma block of the video data are also available for predicting a chroma block of the video data that corresponds to the luma block;

forming a candidate list of prediction modes with respect to the chroma block, the candidate list including a plurality of DMs selected from the multiple DMs that are available for predicting the chroma block, the plurality of the DMs included in the candidate list including two or more of a first prediction mode associated with a center position of the corresponding luma block, a second prediction mode associated with a top-left position of the corresponding luma block, a third prediction mode associated with a top-right position of the corresponding luma block, a fourth prediction mode associated with a below-left position of the corresponding luma block, or a fifth prediction mode associated with a below-right position of the corresponding luma block;

determining to encode the chroma block using any DM of the plurality of the DMs included in the candidate list;

based on the determination to encode the chroma block using any DM of the plurality of the DMs included in the candidate list, coding an indication identifying a selected DM of the candidate list to be used for decoding the chroma block;

encoding the chroma block according to the selected DM of the candidate list;

signaling, in an encoded video bitstream, a one-bit flag indicating that the chroma block is encoded using any DM of the plurality of the DMs included in the candidate list, based on the determination to code the chroma block using any DM of the plurality of the DMs included in the candidate list; and signaling, in the encoded video bitstream, an index value identifying the selected DM of the candidate list to be used for decoding the chroma block based on the determination to encode the chroma block using any DM of the plurality of the DMs included in the candidate list.

14. The method of claim 13, wherein the one-bit flag is a first one-bit flag, the method further comprising:

signaling, in the encoded video bitstream, a second one-bit flag indicating whether the chroma block is encoded using a linear model (LM) mode; and signaling, in the encoded video bitstream, data identifying each respective DM of the plurality of the DMs included in the candidate list.

\* \* \* \* \*